United States Patent
Chen et al.

(10) Patent No.: US 11,792,697 B2
(45) Date of Patent: *Oct. 17, 2023

(54) NETWORK FUNCTION HANDLING IN THE CONTEXT OF INTER-MANAGEMENT FUNCTION MOBILITY

(71) Applicant: Telefonaktiebolaget LM Ericsson (publ), Stockholm (SE)

(72) Inventors: Qian Chen, Mölndal (SE); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,370

(22) Filed: May 18, 2022

(65) Prior Publication Data

US 2022/0279392 A1 Sep. 1, 2022

Related U.S. Application Data

(63) Continuation of application No. 17/254,935, filed as application No. PCT/EP2019/065623 on Jun. 13, 2019, now Pat. No. 11,382,006.

(Continued)

(51) Int. Cl.
*H04W 36/00* (2009.01)
*H04W 8/02* (2009.01)
(Continued)

(52) U.S. Cl.
CPC ......... *H04W 36/0033* (2013.01); *H04W 8/02* (2013.01); *H04W 8/12* (2013.01);
(Continued)

(58) Field of Classification Search
CPC ..... H04W 36/0033; H04W 8/02; H04W 8/12; H04W 8/26; H04W 36/0072
See application file for complete search history.

(56) References Cited

U.S. PATENT DOCUMENTS

2019/0037516 A1 1/2019 Kim et al.

FOREIGN PATENT DOCUMENTS

| RU | 2607996 C2 | 1/2017 |
| WO | 2018088836 A1 | 5/2018 |
| WO | 2019076199 A1 | 4/2019 |

OTHER PUBLICATIONS

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

(Continued)

*Primary Examiner* — Nam T Huynh
(74) *Attorney, Agent, or Firm* — Withrow & Terranova, PLLC

(57) ABSTRACT

A method for a target mobility management entity and a target mobility management entity for executing the method in a core network to communicate network function (NF) utilization information with a source mobility management entity during a change of mobility management entity are disclosed. The method comprises: receiving at least one old NF identifier (ID) from the source mobility management entity that corresponds to an old NF entity serving a user equipment (UE); determining to either use the at least one old NF ID or to use at least one new NF ID that corresponds to a new NF entity of a same NF type as the old NF entity; and communicating, to the source mobility management entity, information that indicates to the source mobility management entity whether the target mobility management entity uses the at least one old NF ID or uses the at least one new NF ID.

15 Claims, 15 Drawing Sheets

Related U.S. Application Data

(60) Provisional application No. 62/689,547, filed on Jun. 25, 2018.

(51) Int. Cl.
    *H04W 8/26*        (2009.01)
    *H04W 48/18*      (2009.01)
    *H04W 8/12*        (2009.01)

(52) U.S. Cl.
    CPC ......... *H04W 8/26* (2013.01); *H04W 36/0072* (2013.01); *H04W 48/18* (2013.01)

(56) References Cited

OTHER PUBLICATIONS

Author Unknown, "Technical Specification Group Services and System Aspects; Procedures for the 5G System; Stage 2 (Release 15)," Technical Specification 23.502, Version 15.1.0, 3GPP Organizational Partners, Mar. 2018, 285 pages.

Author Unknown, "Technical Specification Group Services and System Aspects; Procedures for the 5G System; Stage 2 (Release 15)," Technical Specification 23.502, Version 15.2.0, 3GPP Organizational Partners, Jun. 2018, 308 pages.

Author Unknown, "Technical Specification Group Services and System Aspects; Procedures for the 5G System; Stage 2 (Release 16)," Technical Specification 23.502, Version 16.1.1, 3GPP Organizational Partners, Jun. 2019, 495 pages.

Ericsson et al., "C4-187580: Notification of the change of the PCF," Third Generation Partnership Project (3GPP), TSG CT WG4 Meeting #86bis, Oct. 15-19, 2018, 6 pages, Vilnius, Lithuania.

Huawei, et al., "S2-179633: TS23.502: Procedures for policy management when AMF relocation," 3GPP SA WG2 Meeting #124, Nov. 27-Dec. 1, 2017, Reno, Nevada, 6 pages.

Huawei, et al., "S2-186488: Discussion on AMF-PCF Association Termination," 3GPP TSG-SA2 Meeting #128, Jul. 2-6, 2018, Vilnius, Lithuania, 4 pages.

Extended European Search Report for European Patent Application No. 20203506.9, dated Mar. 4, 2021, 10 pages.

Examination Report for Indian Patent Application No. 202147002876, dated Jan. 21, 2022, 5 pages.

Decision to Grant and Search Report for Japanese Patent Application No. 2020-568433, dated Mar. 14, 2022, 34 pages.

Decision to Grant for Russian Patent Application No. 2021101165, dated Jun. 29, 2021, 25 pages.

International Search Report and Written Opinion for International Patent Application No. PCT/EP2019/065623, dated Sep. 10, 2019, 11 pages.

International Preliminary Report on Patentability for International Patent Application No. PCT/EP2019/065623, dated Apr. 9, 2020, 16 pages.

Notice of Allowance for U.S. Appl. No. 17/254,935, dated Mar. 9, 2022, 8 pages.

(Figure 4.9.1.3.2-1: Inter NG-RAN node N2 based handover, Preparation phase)

Figure 4.9.1.3.3-1: inter NG-RAN node N2 based handover, execution phase

Figure 4.16.1.3-1: Policy Association Establishment with the old PCF

NETWORK FUNCTION HANDLING IN THE CONTEXT OF INTER-MANAGEMENT FUNCTION MOBILITY

This application is a continuation of U.S. patent application Ser. No. 17/254,935, filed Dec. 22, 2020, which is a 35 U.S.C. § 371 national phase filing of International Application No. PCT/EP2019/065623, filed Jun. 13, 2019, which claims the benefit of U.S. Provisional Application No. 62/689,547, filed Jun. 25, 2018, the disclosures of which are incorporated herein by reference in their entireties.

TECHNICAL FIELD

Embodiments presented herein relate to methods, nodes/functions entities, computer and computer program products for a target mobility management function in a core network to communicate network function (NF) utilization information with a source mobility management function during a change of mobility management function.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

3GPP Technical Specification (TS) 23.502 v 15.1.0 has a mobility registration procedure with access and mobility management function (AMF) change, where the old (sometimes referred to herein as "source") AMF may include some network function (NF) identifiers (IDs) (such as, by way of non-limiting example, PCF ID, SMSF ID, or the like) that are used by the user equipment (UE) and are provided to the new (sometimes referred to herein as "target") AMF. The new/target AMF will check if the previously used NFs are still suitable for the UE and if not, new NF IDs may be selected.

FIG. 1 illustrates the Registration procedure (TS 23.502 v 15.1.0, FIG. 4.2.2.2.2-1). Step 5 of the Registration procedure is the following:

5. [Conditional] old AMF to new AMF: Response to Namf_Communication_UEContextTransfer (SUPI, UE Context in AMF (as per Table 5.2.2.2.2-1)).

Old AMF responds to the new AMF for the Namf_Communication_UEContextTransfer invocation by including the UE's SUPI and MM Context.

If old AMF holds information about established PDU Sessions, the old AMF includes Session Management Function (SMF) information DNN, S-NSSAI(s) and PDU Session ID.

If old AMF holds information about active NGAP UE-TNLA bindings to N3IWF, the old AMF includes information about the NGAP UE-TNLA bindings.

Step 16 of the Registration procedure is the following:

16. [Optional] new AMF performs a Policy Association Establishment as defined in clause 4.16.1.2. For an Emergency Registration, this step is skipped.

If the new AMF contacts the Policy Control Function (PCF) identified by the (V-)PCF ID received during inter-AMF mobility in step 5, the new AMF shall include the (V-)PCF ID in the Npcf_AMPolicyControl Get operation. This indication is not included by the AMF during initial registration procedure.

If the AMF notifies the Mobility Restrictions (e.g. UE location) to the PCF for adjustment, or if the PCF updates the Mobility Restrictions itself due to some conditions (e.g. application in use, time and date), the PCF shall provide the updated Mobility Restrictions to the AMF.

Step 21 of the Registration procedure is the following:

21. [Conditional] old AMF to (V-)PCF: AMF-Initiated Policy Association Termination.

If the old AMF previously initiated a Policy Association to the PCF, and the old AMF did not transfer the PCF ID to the new AMF (e.g. new AMF is in different PLMN), the old AMF performs an AMF-initiated Policy Association Termination procedure, as defined in clause 4.16.3.2, to delete the association with the PCF.

The AMF establishes the connection/association with PCF (new PCF selected vs PCF re-used) in accordance with the following:

4.16.1 Policy Association Establishment
4.16.1.1 General

There are three cases considered for Policy Association Establishment:

1. UE initial registration with the network.
2. The AMF re-allocation without PCF change in handover procedure and registration procedure.
3. The AMF re-allocation with PCF change in handover procedure and registration procedure.

FIG. 2 illustrates the AM Policy Association Establishment with new Selected PCF (TS 23.502 v 15.1.0, FIG. 4.16.1.2-1).

4.16.1.2 AM Policy Association Establishment with new Selected PCF. This procedure concerns the following scenarios:

1. UE initial registration with the network.
2. The AMF re-allocation with PCF change in handover procedure and registration procedure.

This procedure concerns both roaming and non-roaming scenarios.

FIG. 3 illustrates the Policy Association Establishment with the old PCF (TS 23.502 v 15.1.0, FIG. 4.16.1.3-1).

AM Policy Association Establishment with the Old PCF

The procedure concerns the situation involving AMF relocation without PCF change in handover procedure and registration procedure.

This procedure concerns both roaming and non-roaming scenarios.

FIG. 4 illustrates the Registration procedure supporting Short Message Service (SMS) over NAS (TS 23.502 v 15.1.0, FIG. 4.13.3.1-1).

Below is how the AMF manages the connection/association with the SMSF.

4.13.3.2 Deregistration Procedures for SMS Over NAS

If the UE indicates to the AMF that the UE no longer wants to send and receive SMS over NAS (e.g., not including "SMS supported" indication in subsequent Registration Request message) or if the AMF considers that the UE is deregistered or the AMF receives a Deregistration Notification from the UDM indicating UE Initial Registration, Subscription Withdrawn or 5GS to EPS Mobility as specified in clause 5.2.3.2.2 of TS 23.502 v 15.1.0, the AMF invokes a Nsmsf_SMService_Deactivate service operation to trigger the release of the UE Context for SMS on SMSF based on local configurations. The AMF may delete or deactivate the stored SMSF address in its UE Context. The SMSF shall invoke a Nudm_UECM_Deregistration (SUPI, NF ID, Access Type) service operation from UDM to trigger the UDM to delete the SMSF address of the UE. The UDM may update the UE context in SMSF in UDR by Nudr_DM_Update (SUPI, Subscription Data, SMS Subscription data, SMSF address). The SMSF also removes the UE Context for SMS, including AMF address.

SUMMARY

There currently exist certain situations when moving from a source mobility management function (e.g., a source AMF) to a target mobility management function (e.g., a target AMF) where it is not defined whether the source AMF should terminate associations with NFs or not. In particular, when some NFs are selected by an AMF during initiation registration or initial PDU session establishment, a long-life connection/association will be created between the AMF and the NFs, such as, by way of non-limiting example, PCF and/or SMSF (SMF change will come in 3GPP rel-16).

During UE mobility and when a new/target AMF is selected, if the old/source AMF does not provide information related to the selected/old NFs, i.e. the PCF ID or SMSF ID to the new/target AMF, then it is clear, at least for the PCF case (SMSF change is not named currently in the TS), that the old/source AMF is responsible for connection/association release.

However, in the situation where the old/source AMF provides information related to the selected NFs, such as providing the PCF ID and/or SMSF ID, for example, the new/target AMF may decide to either 1) re-use the NFs selected by the old/source AMF, or 2) select new NFs to serve the UE and PDU sessions. However, the long-life connection/association handling between the old/source AMF and the NFs is not clearly specified, regardless of whether the NFs are re-used or new NFs are selected.

Certain aspects of the present disclosure and their embodiments provide solutions to the aforementioned or other challenges.

The solution proposes:

1. A mechanism between the new/target AMF and the old/source AMF, during an inter-AMF mobility procedure, to allow the new/target AMF to inform the old/source AMF if the NF (e.g., SMSF, PCF, SMF), which were selected for the UE and PDU session(s) by the old/source AMF, will be re-used or not. The target AMF may make a separate indication for each NF, such that the target AMF may indicate that some NFs are reused, and others are not.

2. If not reused, the old/source AMF is responsible for initiating the release of connection/association of the NFs after being informed by the new/target AMF.

There are, proposed herein, various embodiments that address one or more of the issues disclosed herein.

In one embodiment, a method for a target mobility management function in a core network to communicate network function (NF) utilization information with a source mobility management function during a change of mobility management function is provided. The method includes receiving, by the target mobility management function, at least one old NF identifier (ID) from the source mobility management function that corresponds to an old network function (NF) serving a user equipment (UE). The method further includes determining to either use the at least one old NF ID or to use at least one new NF ID that corresponds to a new NF of a same NF type as the old NF. The method further includes communicating, by the target mobility management function to the source mobility management function, information that indicates to the source mobility management function whether the target mobility management function uses the at least one old NF ID or uses the at least one new NF ID.

In another embodiment, a target mobility management function node for communicating network function (NF) utilization information with a source mobility management function node during a change of mobility management function is provided. The target mobility management function node includes one or more processors and includes memory storing instructions executable by the one or more processors. The target mobility management function node is operable to perform the method of receiving, by the target mobility management function node, at least one old NF identifier (ID) from the source mobility management function node that corresponds to an old network function (NF) serving a user equipment (UE), determining to either use the at least one old NF ID or to use at least one new NF ID that corresponds to a new NF of a same NF type as the old NF, and communicating, by the target mobility management function node to the source mobility management function node, information that indicates to the source mobility management function node whether the target mobility management function node uses the at least one old NF ID or uses the at least one new NF ID.

In another embodiment, a method for a source mobility management function in a core network to receive network function (NF) utilization information from a target mobility management function during a change of mobility management function is provided. The method includes sending, by the source mobility management function to the target mobility management function, at least one old NF identifier (ID) that corresponds to an old network function (NF) serving a user equipment (UE). The method further includes receiving, by the source mobility management function from the target mobility management function, information that indicates whether the target mobility management function uses the at least one old NF ID or uses at least one new NF ID that corresponds to a new NF serving the UE.

In another embodiment, a source mobility management function node for receiving network function (NF) utilization information from a target mobility management function node during a change of mobility management function is provided. The source mobility management function node includes one or more processors and includes memory storing instructions executable by the one or more processors, whereby the source mobility management function node is operable to perform the method of sending, by the source mobility management function node to the target mobility management function node, at least one old NF identifier (ID) that corresponds to an old network function (NF) serving a user equipment (UE), and receiving, by the source mobility management function node from the target mobility management function node, information that indicates whether the target mobility management function node uses the at least one old NF ID or uses at least one new NF ID that corresponds to a new NF serving the UE.

Certain embodiments may provide one or more of the following technical advantage(s).

BRIEF DESCRIPTION OF THE DRAWINGS

The proposed solutions are now described, by way of example, with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
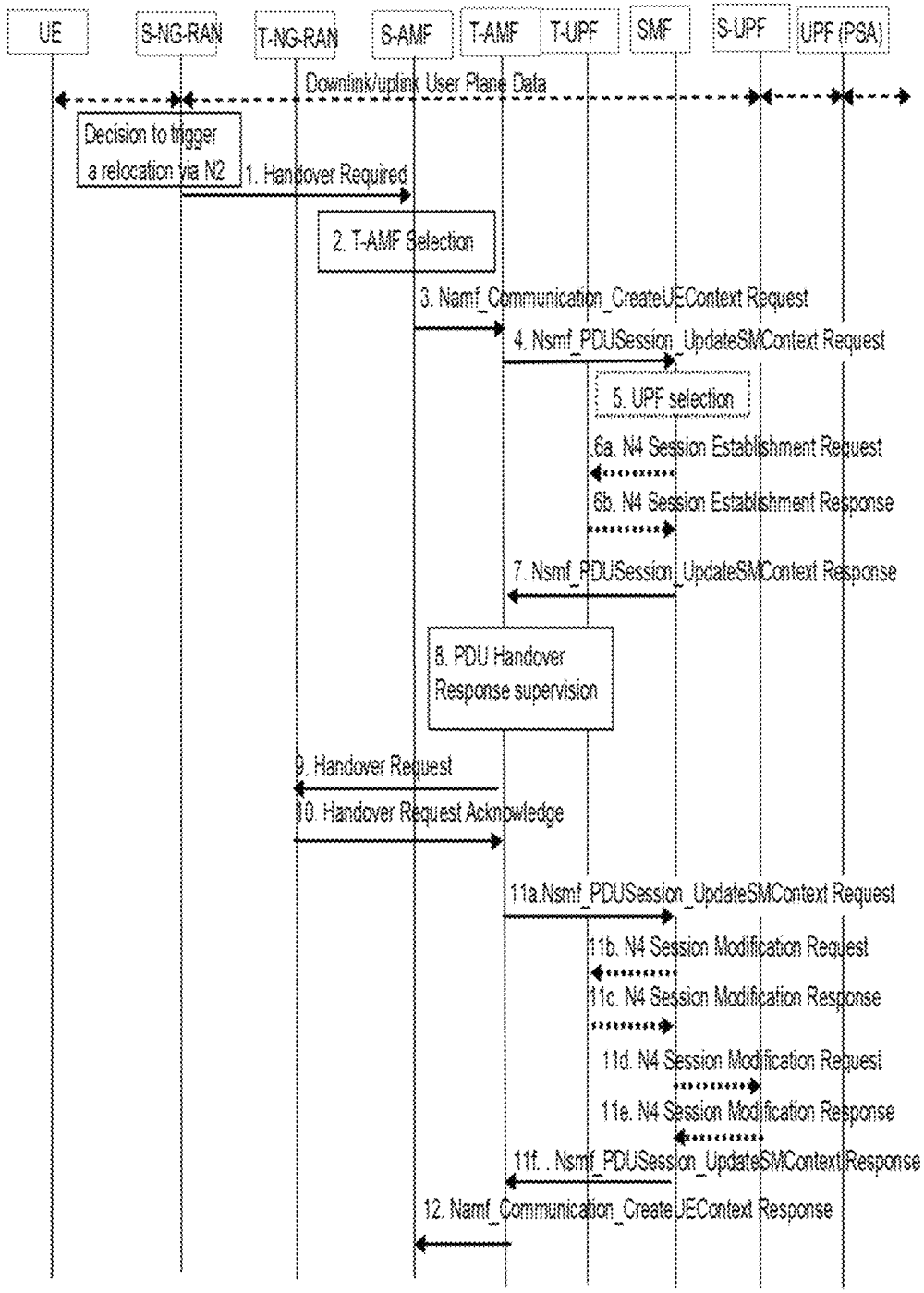
FIG. 1 illustrates a Registration procedure.
Figure 2:
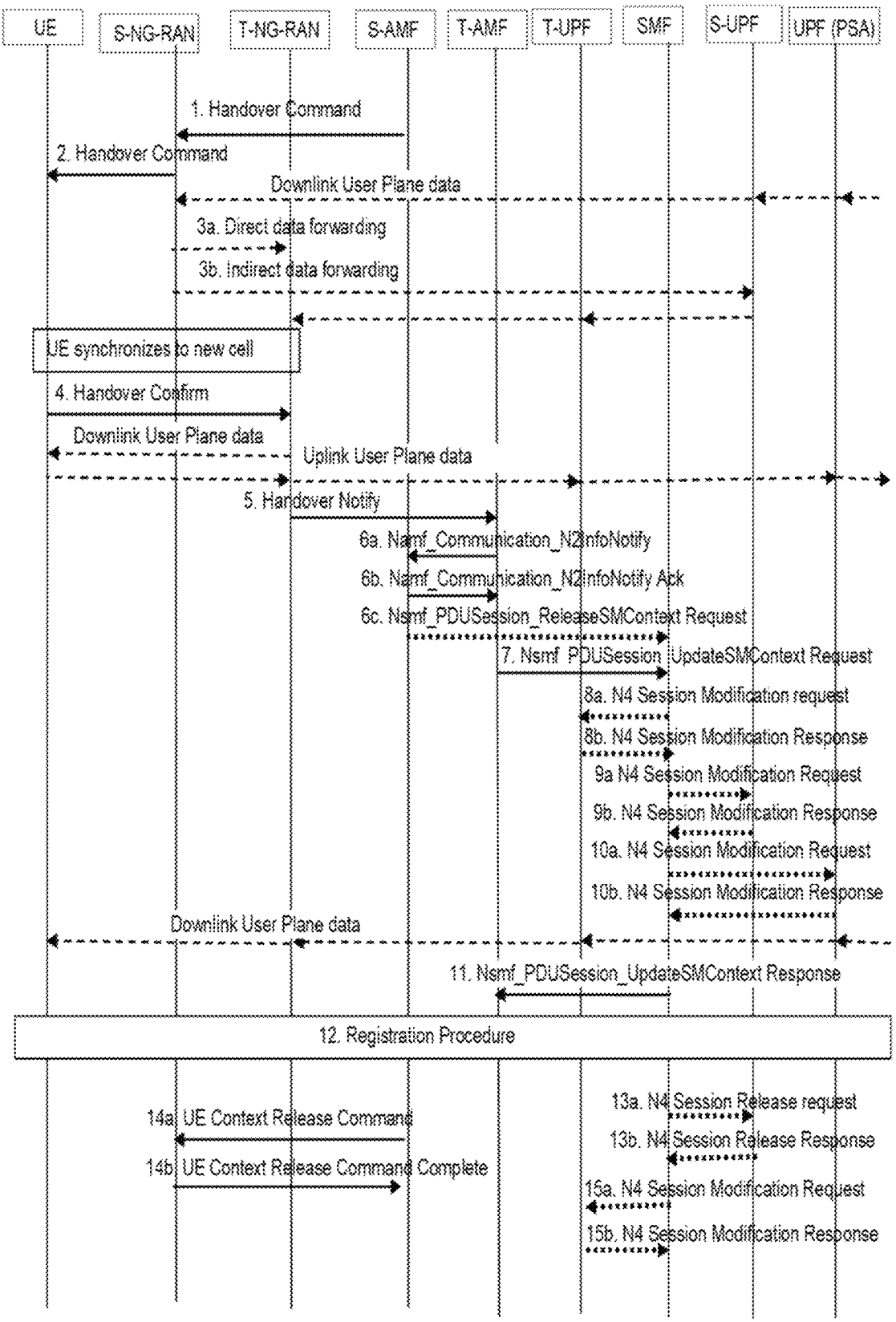
FIG. 2 illustrates an AM Policy Association Establishment with new Selected PCF.
Figure 3:
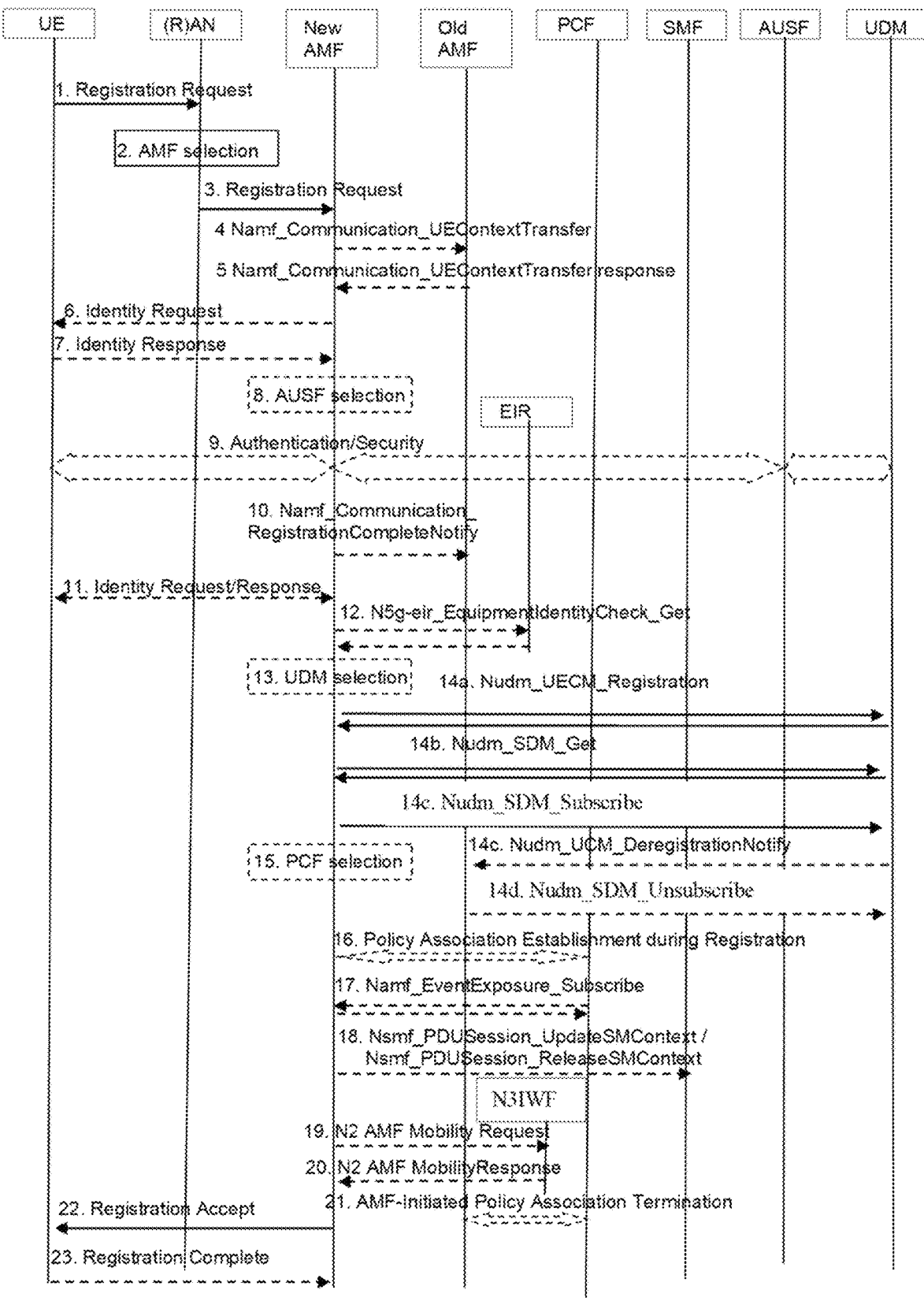
FIG. 3 illustrates a Policy Association Establishment with an PCF.
Figure 4:
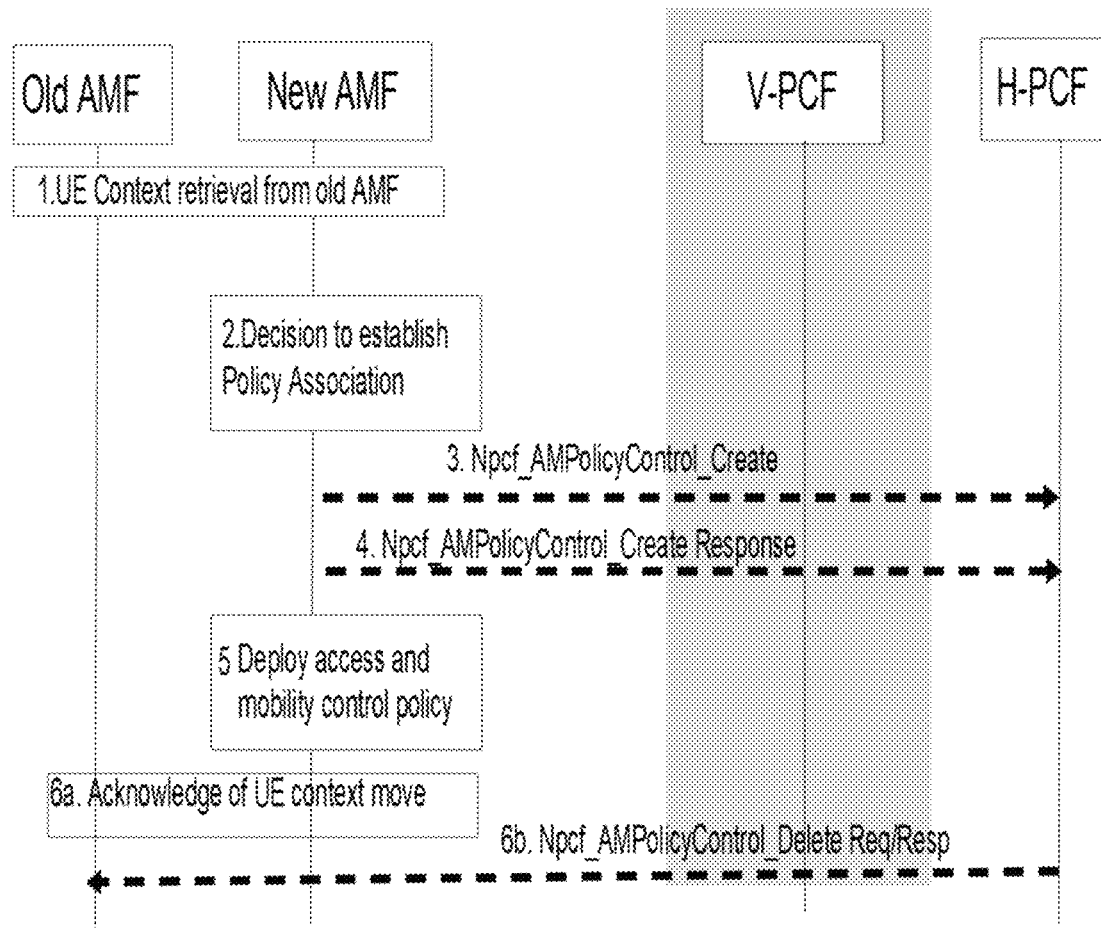
FIG. 4 illustrates a Registration procedure supporting SMS over NAS.
Figure 5:
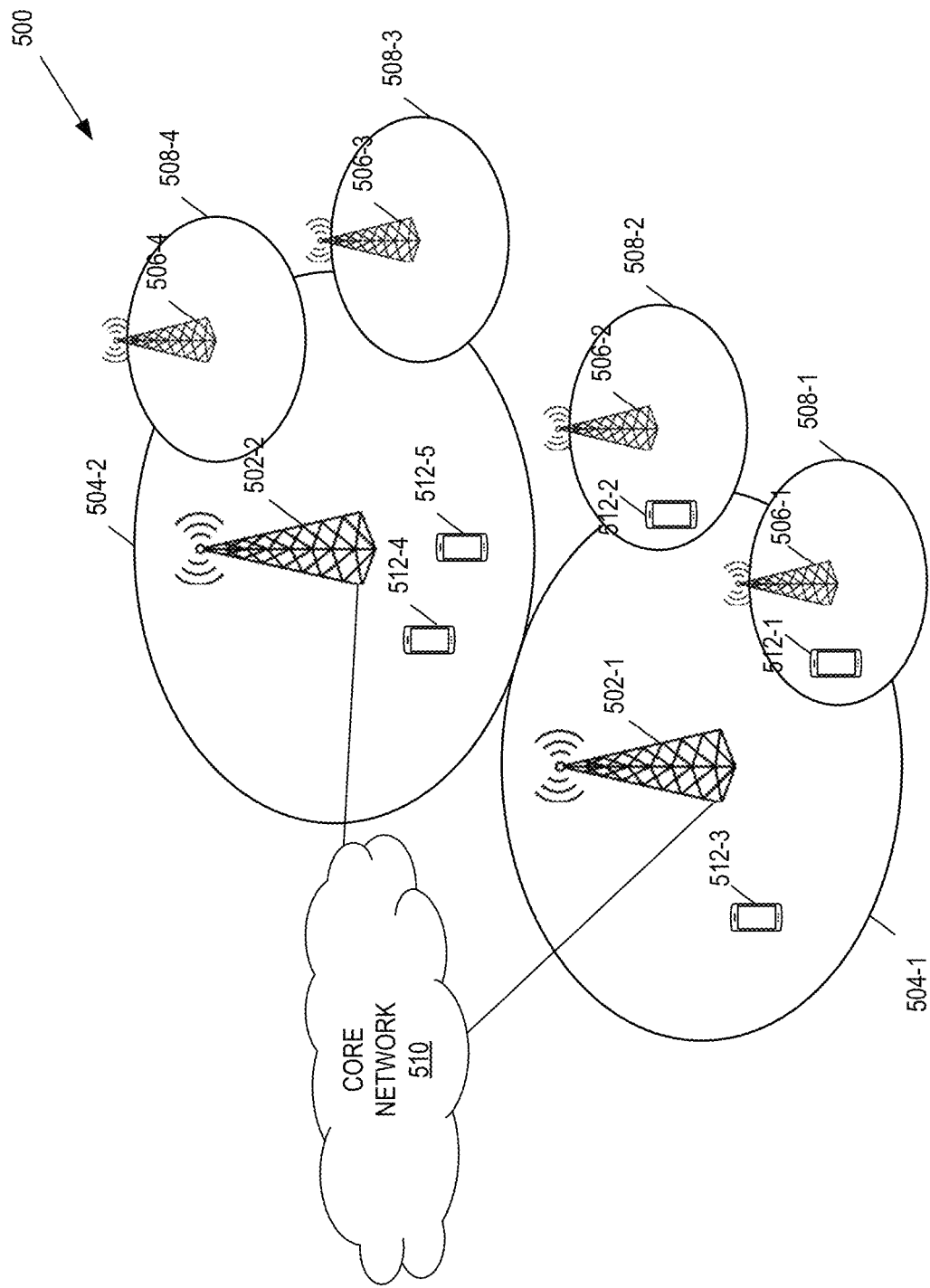
FIG. 5 illustrates one example of a cellular communications network 500 according to some embodiments of the present disclosure.

FIG. 5 illustrates one example of a cellular communications network 500 according to some embodiments of the present disclosure. In the embodiments described herein, the cellular communications network 500 is a 5G NR network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Figure 6:
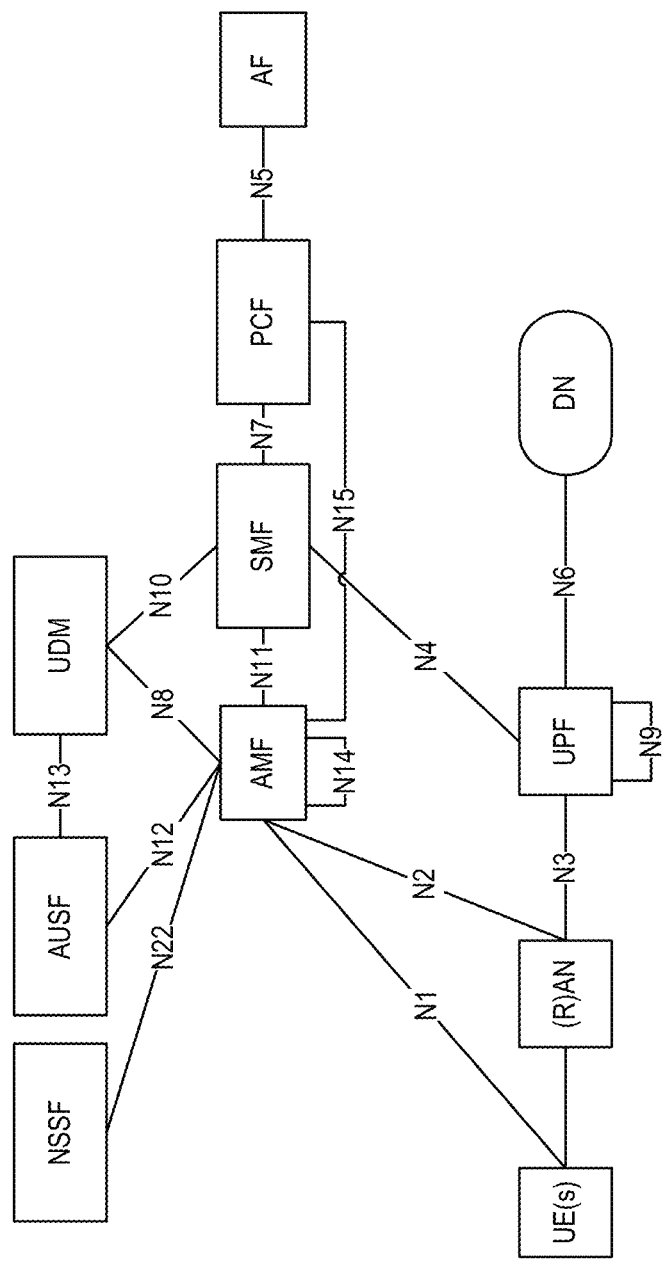
FIG. 6 illustrates a wireless communication system represented as an example 5G network architecture with NFs using point-to-point reference points/interfaces.

FIG. 6 illustrates an exemplifying wireless communication system represented as a 5G network architecture composed of core Network Functions (NFs), where interaction between any two NFs is represented by a point-to-point reference point/interface. FIG. 6 can be viewed as one particular implementation of the cellular communications network 500 of FIG. 5.

Seen from the access side, the 5G network architecture shown in FIG. 6 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 6 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and the AMF. The reference points for connecting between the AN and the AMF and between the AN and the UPF are defined as N2 and N3, respectively. There is a reference point, N11, between the AMF and the SMF, which implies that the SMF is at least partly controlled by the AMF. N4 is used by the SMF and the UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and the SMF, respectively. N12 is required for the AMF to perform authentication of the UE. N8 and N10 are defined because the subscription data of the UE is required for the AMF and the SMF.

The 5G core network aims at separating user plane and control plane. The user plane carries user traffic while the control plane carries signaling in the network. In FIG. 6, the UPF is in the user plane and all other NFs, i.e., the AMF, SMF, PCF, AF, AUSF, and UDM, are in the control plane. Separating the user plane and the control plane guarantees that each plane resource will be scaled independently. It also allows UPFs to be deployed separately from control plane functions in a distributed fashion. In this architecture, UPFs may be deployed very close to UEs to shorten the Round Trip Time (RTT) between UEs and data networks for some applications requiring low latency.

The core 5G network architecture is composed of modularized functions. For example, the AMF and SMF are independent functions in the control plane. Separated AMF and SMF allow independent evolution and scaling. Other control plane functions like the PCF and the AUSF can be separated as shown in FIG. 6. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 7:
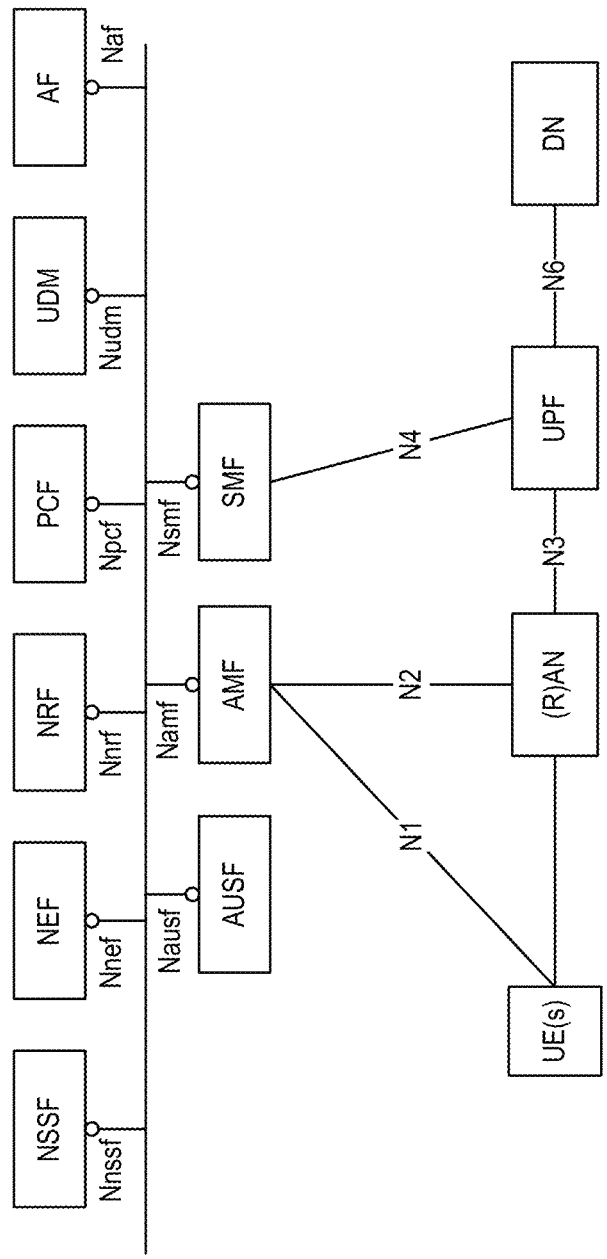
FIG. 7 illustrates an example of a 5G network architecture using service-based interfaces between the NFs in the control plane.

FIG. 7 illustrates a 5G network architecture using service-based interfaces between the NFs in the control plane, instead of the point-to-point reference points/interfaces used in the 5G network architecture of FIG. 6. However, the NFs described above with reference to FIG. 6 correspond to the NFs shown in FIG. 7. The service(s) etc. that a NF provides to other authorized NFs can be exposed to the authorized NFs through the service-based interface. In FIG. 7, the service-based interfaces are indicated by the letter "N" followed by the name of the NF, e.g. Namf for the service-based interface of the AMF and Nsmf for the service-based interface of the SMF, etc. The Network Exposure Function (NEF) and the Network Repository Function (NRF) in FIG. 7 are not shown in FIG. 6 discussed above. However, it should be clarified that all NFs depicted in FIG. 6 can interact with the NEF and the NRF of FIG. 7 as necessary, though not explicitly indicated in FIG. 6.

Some properties of the NFs shown in FIGS. 6 and 7 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for user plane data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure. The NFs UPF, AMF, SMF, PCF, AF, AUSF, and UDM are specific examples of a User Plane (UP) entity, a Mobility Management (MM) entity, a Session Management (SM) entity, a Policy and Charging (PC) entity, an Application entity, an Authentication Server entity and a Unified Data Management entity respectively.

The embodiments enhance communication between a source mobility management function, such as, by way of non-limiting example, a source access and mobility management function (AMF), and a target mobility management function, such as by way of non-limiting example, a target AMF, during a change from the source mobility management function to the target mobility management function. The change, for example, may be a handover. The target mobility management function informs the source mobility management function whether old network functions that were used by the source mobility management function will be used by the target mobility management function, or whether new network functions will be used. If new network functions are being used the target mobility management function, the source mobility management function may perform one or more acts to dissociate from the previous network functions.

The embodiments have applicability in a wide range of applications, including, by way of non-limiting example, the standards TS 23.501 and TS 23.502.

In one embodiment, during a CM-IDLE/CM-CONNECTED mode mobility with AMF change, a new/target AMF shall indicate to an old/source AMF if any old NF has been re-used or wherein new NFs have been selected for the UE in the following AMF services, in case the old AMF has provided information that identifies old NFs for the UE.

In one embodiment, the Namf_Communication_RegistrationCompleteNotify service operation may be modified in the following manner to support communications between the target AMF and the source AMF regarding whether a new NF has been selected or old NFs are being utilized.

5.2.2.2.3 Namf_Communication_ReqistrationCompleteNotify Service Operation

Service operation name: Namf_Communication_RegistrationCompleteNotify

Description: This service operation is used by the consumer NF to inform the AMF that a prior UE context transfer has resulted in the UE successfully registering with it. The UE context is marked inactive in the AMF.

NOTE 1: This notification corresponds to an implicit subscription.

Input, Required: 5G-GUTI, Reason.

Input, Optional: PDU Session ID(s) (indicates the PDU Session(s) to be released), [IN ONE EMBODIMENT, THIS INFORMATION MAY BE EXPANDED TO INCLUDE: NF change related indications (such as, by way of non-limiting example, that a new PCF/SMSF has been selected or that the old PCF/SMSF is being re-used).]

Output, Required: None.

Output, Optional: None.

See clause 4.2.2.2.2 step 10 for example usage of this service operation. When the consumer NF (AMF) receives this notification, it marks the UE context information as inactive since the UE context has been successfully transferred to the peer NF and the UE has successfully registered there. The AMF sends a Namf_Communication_TransferComplete ack to the consumer NF.

In one embodiment, the Namf_Communication_N2InfoNotify service operation may be modified in the following manner to support communications between the target (new) AMF and the source (old) AMF regarding whether a new NF has been selected or old NFs are being utilized.

5.2.2.2.10 Namf_Communication_N2InfoNotify Service Operation

Service operation name: Namf_Communication_N2InfoNotify.

Description: The AMF uses this service operation to notify a particular N2 message information towards the NFs that have subscribed (implicitly or explicitly) for the specific information.

Input, Required: AMF ID (GUAMI), N2 information.

Input, Optional: [IN ONE EMBODIMENT, THIS INFORMATION MAY BE EXPANDED TO INCLUDE: NF change-related indications (such as, by way of non-limiting example, that a new PCF/SMSF has been selected or that the old PCF/SMSF is being re-used).] Session ID (e.g. PDU Session ID) if the N2 information notified is related to a session (e.g. PDU Session).

Output, Required: None.

Output, Optional: None.

In one embodiment, the Namf_Communication_CreateUEContext service operation may be modified in the following manner to support communications between the target (new) AMF and the source (old) AMF regarding whether a new NF has been selected or old NFs are being utilized.

5.2.2.2.11 Namf_Communication_CreateUEContext Service Operation

Service operation name: Namf_Communication_CreateUEContext

Description: This service operation is used by an old AMF to create the UE context in a new AMF during handover procedures.

Input, Required: 5G-GUTI, UE context of the identified UE. As described in Table 5.2.2.2.2-1, the UE context may include the SUPI, DRX parameters, AM policy information, PCF ID, UE network capability, used N1 security context information, event subscriptions by other consumer NF, and the list of SM PDU Session IDs along with the SMF handling the PDU Session, N2 information including source to target RAN transparent container, Endpoint information of S-AMF to receive N2 information notification about handover complete.

Input, Optional: allocated EBI information, PCF ID.

Output, Required: Cause, N2 information including Target to Source transparent container, N2 SM information (PDU Sessions failed to be setup list, and the N3 DL forwarding information), handle for the UE context created, [IN ONE EMBODIMENT, THIS INFORMATION MAY BE EXPANDED TO INCLUDE: NF change-related indications (i.e. a new SMF has been selected or an old SMF is re-used).]

Output, Optional: None.

Note: in case of HO, New changes can either be made in 5.2.2.2.10 (more suitable if the NF is PCF or SMSF) or in 5.2.2.2.11 (more suitable if the NF is SMF)

The above service operations may be used in various procedures, including, for example, the preparation phase and the execution phase of the hand over procedure, for CM-CONNECTED mode mobility.

Figure 8:
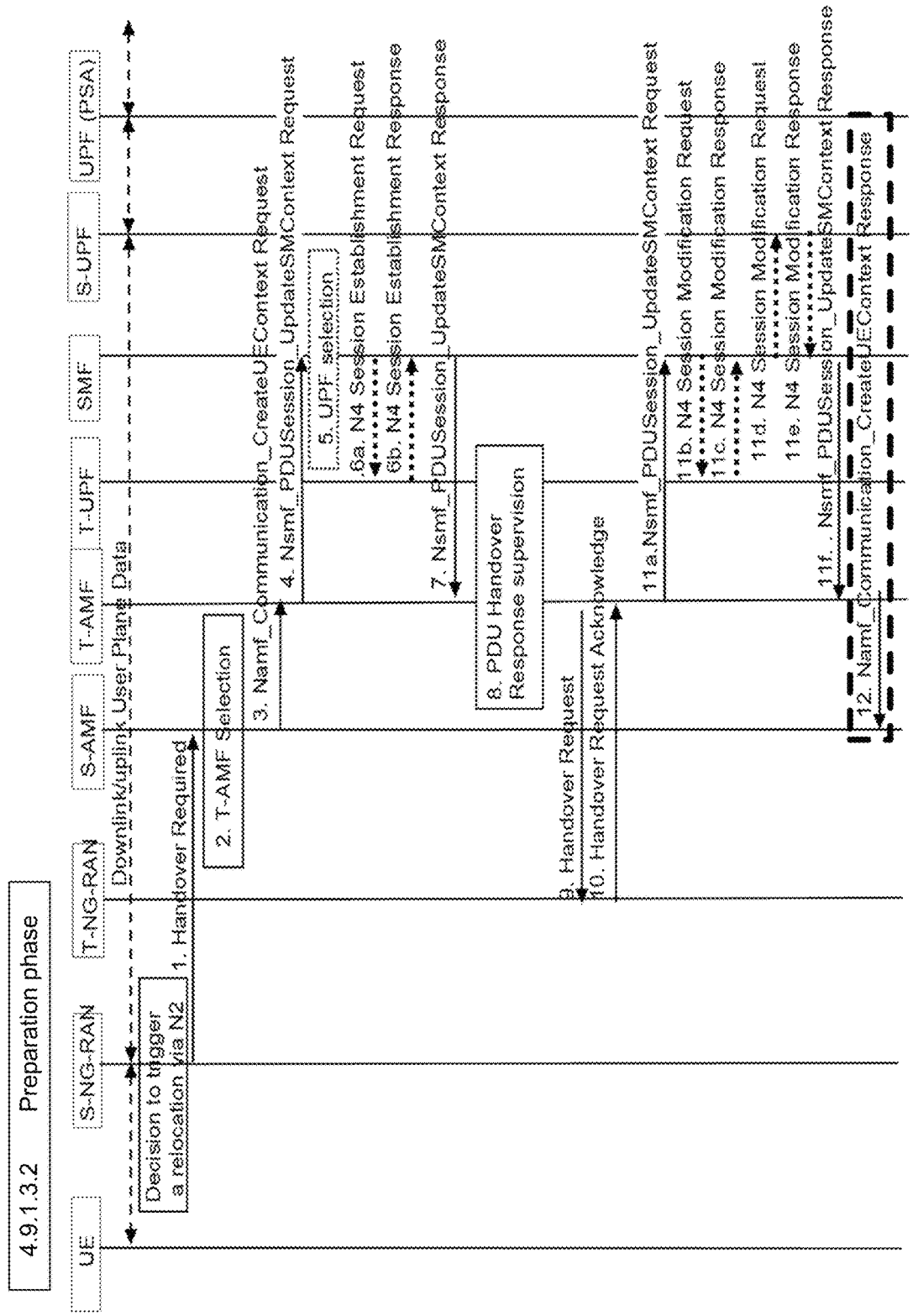
FIG. 8 illustrates a Preparation Phase.

FIG. 8 illustrates the 4.9.1.3.2 Preparation Phase. In support of the embodiments, Step 12 of the Preparation Phase may be updated to including the following:

12. [Conditional] T-AMF to S-AMF:

Namf_Communication_CreateUEContext Response (N2 information necessary for S-AMF to send Handover Command to S-RAN including Target to Source transparent container, PDU Sessions failed to be setup list, N2 SM information (N3 DL forwarding Information)).

AMF supervises the Nsmf_PDUSession_UpdateSMContext Response message from the involved SMFs. At expiry of the maximum wait time or when all Nsmf_PDUSession_UpdateSMContext Response messages are received, T-AMF sends the Namf_Communication_CreateUEContext Response to the S-AMF.

[IN ONE EMBODIMENT, THE INFORMATION MAY BE UPDATED TO INCLUDE: If the S-AMF (source AMF) has identified old NF IDs (e.g. SMF IDs) in step 3, the T-AMF (target AMF) shall indicate back whether the old NF IDs (e.g. SMF IDs) are being re-used by the target AMF or whether new NF IDs are selected by the target AMF.]

The Target to Source transport container is received from the T-RAN. The N2 SM Information is received from the SMF in step 11f.

Figure 9:
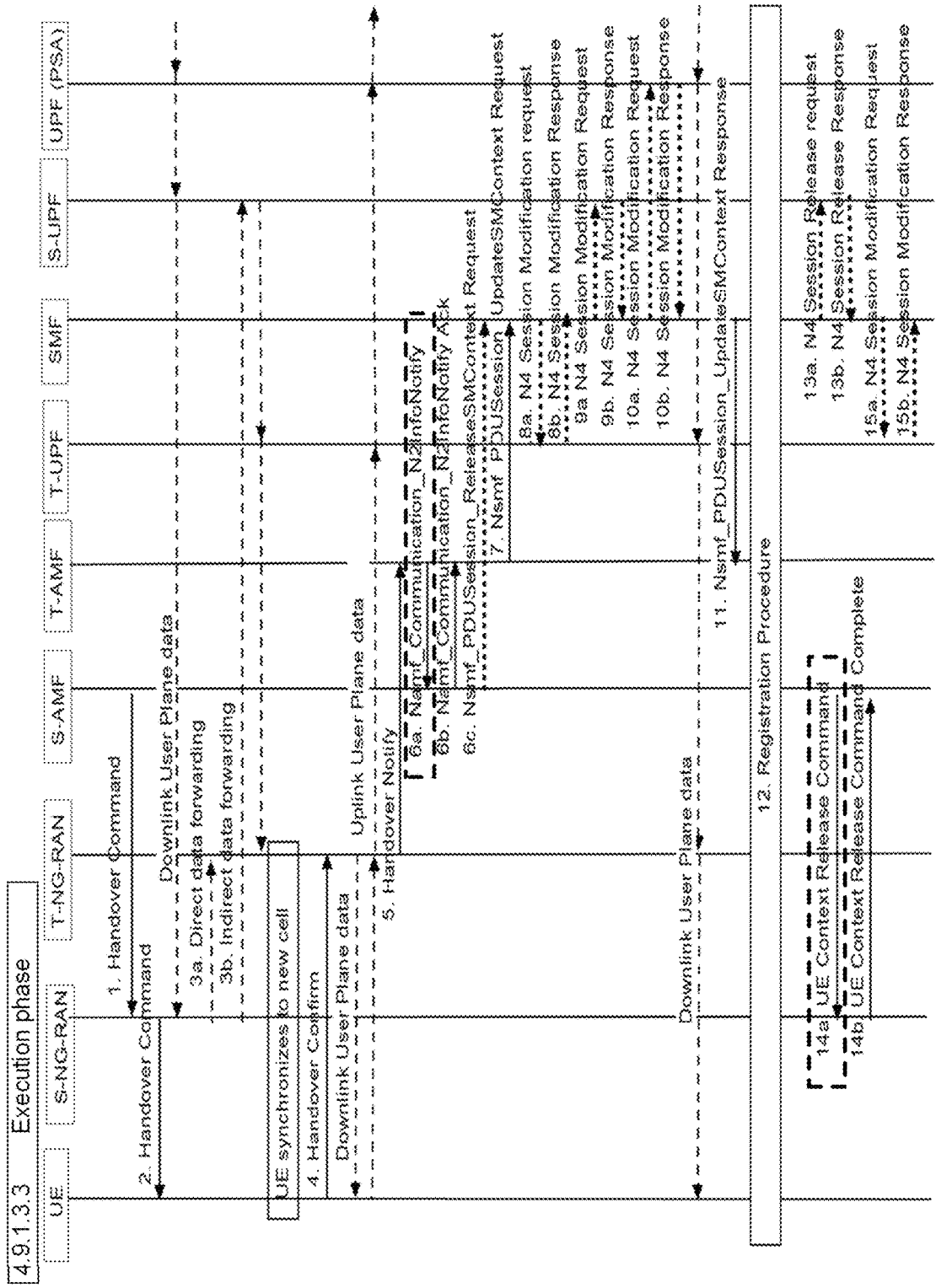
FIG. 9 illustrates an Execution Phase.

FIG. 9 illustrates the 4.9.1.3.3 Execution Phase. In support of the embodiments, Step 6a of the Preparation Phase may be updated to include the following:

6a. [Conditional] T-AMF to S-AMF: Namf_Communication_N2InfoNotify.

The T-AMF notifies to the S-AMF about the N2 handover notify received from the T-RAN by invoking the Namf_Communication_N2InfoNotify.

[IN ONE EMBODIMENT, THE INFORMATION MAY BE UPDATED TO INCLUDE: If the S-AMF has provided selected NF IDs (e.g. PCF ID, SMSF IDs, and the like) in preparation phase step 3, the new AMF shall indicate back if the NF IDs are re-used by the new AMF or new NF IDs are selected/used by the new AMF.]

A timer in S-AMF is started to supervise when resources in S-RAN shall be release.

Step 14a may also be updated in the following manner:
14a. S-AMF to S-NG-RAN: UE Context Release Command ( )

After the timer in step 6a expires, the S-AMF sends UE Context Release Command.

[IN ONE EMBODIMENT, THE INFORMATION MAY BE UPDATED TO INCLUDE: The S-AMF also invokes the Nsmf_PDUSession_ReleaseSMContext service operation to release the resource in SMF, in case an SMF change is indicated in step 12 of the preparation phase.]

14b. S-NG-RAN to S-AMF: UE Context Release Complete Q.

The source NG-RAN releases its resources related to the UE and responds with a UE Context Release Complete 0 message.

Figure 10:
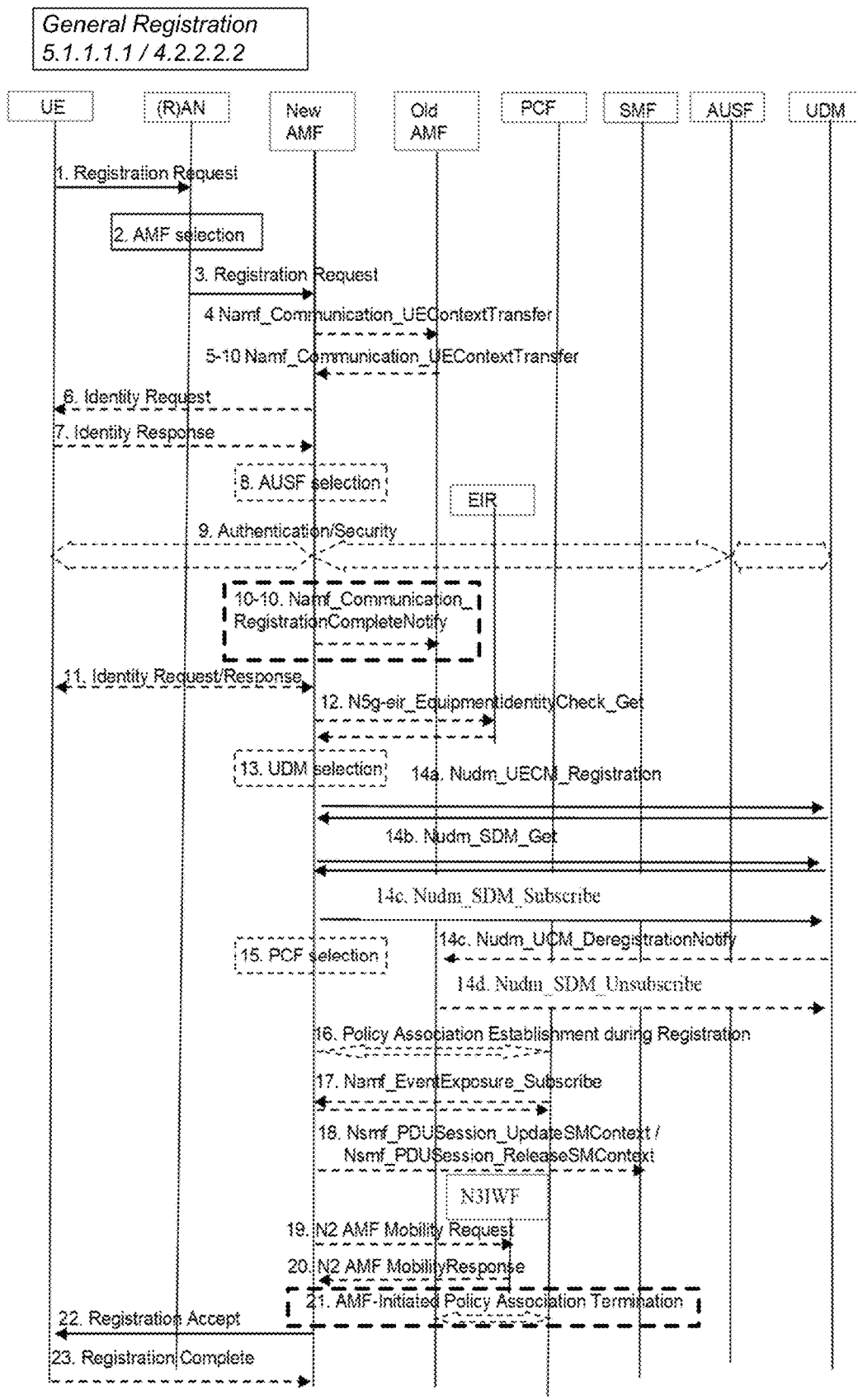
FIG. 10 illustrates a General Registration procedure, either for CM-IDLE mode mobility or CM-CONNECTED mode mobility.

FIG. 10 illustrates 5.1.1.1.1 and 4.2.2.2.2 General Registration procedure, either for CM-IDLE mode mobility or CM-CONNECTED mode mobility.

Step 5. [Conditional] old AMF to new AMF: Response to Namf_Communication_UEContextTransfer (SUPI, UE Context in AMF (as per Table 5.2.2.2.2-1)) or UDSF to new AMF: Nudsf_Unstructured Data Management_Query( ).

If the UDSF was queried in step 4, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP UE-TNLA bindings to N3IWF, the old AMF includes information about the NGAP UE-TNLA bindings. If the Old AMF was queried in step 4, Old AMF responds to the new AMF for the Namf_Communication_UEContextTransfer invocation by including the UE's SUPI and UE Context.

If old AMF holds information about established PDU Session(s), the old AMF includes SMF information, DNN(s), S-NSSAI(s) and PDU Session ID(s).

If old AMF holds information about active NGAP UE-TNLA bindings to N3IWF, the old AMF includes information about the NGAP UE-TNLA bindings.

If old AMF fails the integrity check of the Registration Request NAS message, the old AMF shall indicate the integrity check failure.

If old AMF holds information about AM Policy Association, the old AMF includes the information about the AM Policy Association including the policy control request trigger and PCF ID. In the roaming case, V-PCF ID and H-PCF ID are included.

In support of the embodiments, Step 10 may be updated to including the following:

10. [Conditional] new AMF to old AMF: Namf_Communication_RegistrationCompleteNotify ( ).

If the AMF has changed the new AMF notifies the old AMF that the registration of the UE in the new AMF is completed by invoking the Namf_Communication_RegistrationCompleteNotify service operation.

If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationCompleteNotify service operation including the rejected PDU Session ID and a reject cause (e.g. the S-NSSAI becomes no longer available) towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

[IN ONE EMBODIMENT, THE INFORMATION MAY BE UPDATED TO INCLUDE: If the old AMF has provided selected/old NF IDs (e.g. PCF ID, SMSF IDs, . . . ), the new AMF shall indicate if these NF IDs are re-used by the new AMF or new NF IDs are selected by the new AMF.]

See clause 5.2.2.2.3 for details of Namf_Communication_RegistrationCompleteNotify service operation.

In support of the embodiments, Step 21 may be updated to include the following:

21. [Conditional] old AMF to (V-)PCF: AMF-Initiated Policy Association Termination.

If the old AMF previously initiated a Policy Association to the PCF, and the old AMF did not transfer the [IN ONE EMBODIMENT, THE INFORMATION MAY BE UPDATED TO INCLUDE: selected/old NF IDs, e.g. PCF ID] to the new AMF (e.g. new AMF is in different PLMN), the old AMF performs an AMF-initiated Policy Association Termination procedure, as defined in clause 4.16.3.2, to delete the association with the PCF [IN ONE EMBODIMENT, THE INFORMATION MAY BE UPDATED TO INCLUDE: and release the resource in PCF.]

[IN ONE EMBODIMENT, THE INFORMATION MAY BE UPDATED TO INCLUDE: If the source AMF transferred the selected/old NF IDs to the target AMF, and the target AMF has indicated back in step 10 (or step 6a in the execution phase of the N2 HO procedure) if the selected/old NF IDs are re-used or if new NF IDs are selected by the target AMF, the source AMF either performs local release of the PCF or an AMF-initiated Policy Association Termination procedure, as defined in clause 4.16.3.2, to delete the association with the PCF.

Figure 11:
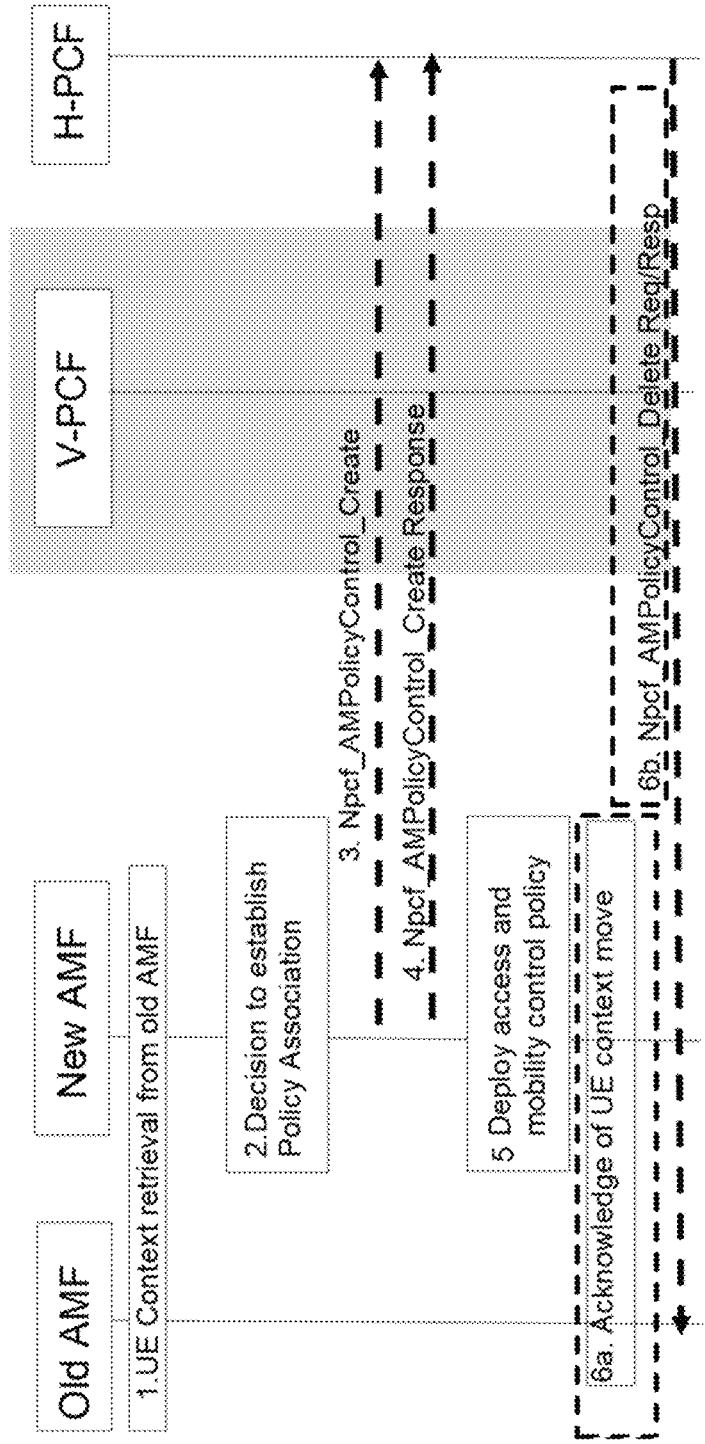
FIG. 11 illustrates a Policy Association Establishment procedure with a PCF.

FIG. 11 illustrates the 4.16.1.3-1: Policy Association Establishment with the old PCF procedure. In support of the embodiments, Steps 6a and 6b may be added in the following manner.

AM Policy Association Establishment with the Old PCF

The procedure relates to the situation of AMF relocation without PCF change in handover procedure and registration procedure.

[IN ONE EMBODIMENT, THE FOLLOWING STEPS MAY BE ADDED: Steps 6a, 6b, Based on provided NF (e.g. PCF) re-use or NF change information from the new/target AMF (as specified in Registration procedure or HO procedure), the old AMF may initiate Policy Association Termination procedure, as defined in clause 4.16.3.2, to delete the association with the PCF or may only perform a local PCF release.]

Figure 12:
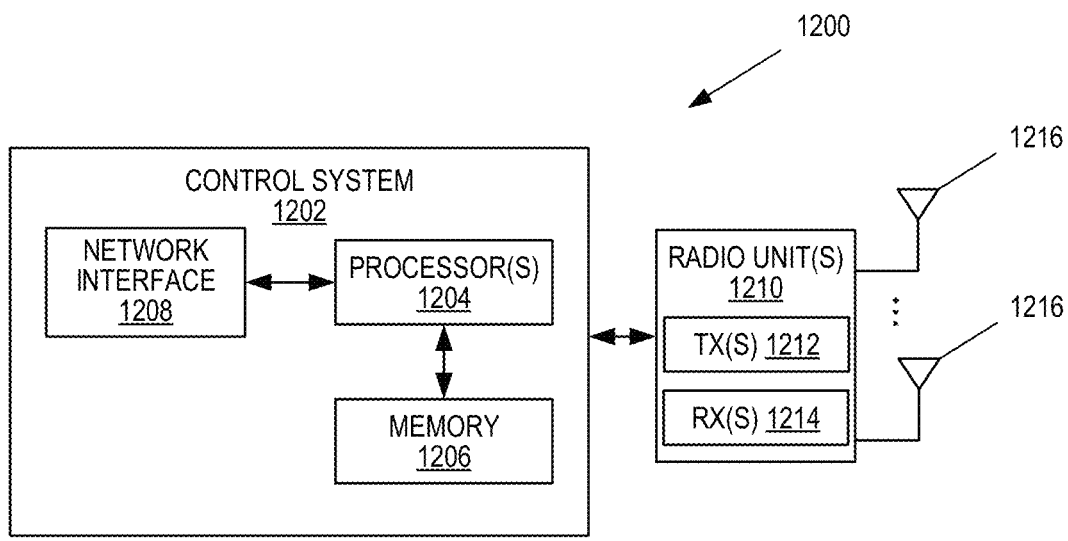
FIG. 12 is a schematic block diagram of a network function node suitable for implementing a source mobility management function or target mobility management function according to some embodiments.

FIG. 12 is a schematic block diagram of a network function node suitable for implementing a source mobility management function or target mobility management function according to some embodiments of the present disclosure. The network function node 1200, for example, may be a computing device or other processing device. As illustrated, the network function node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the network function node 1200 may, in some embodiments, include one or more radio units 1210 that each include one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of the network function node 1200 as described herein. In some embodiments, the function(s) are implemented in software that is stored, e.g., in the memory 1206 and executed by the one or more processors 1204.

Figure 13:
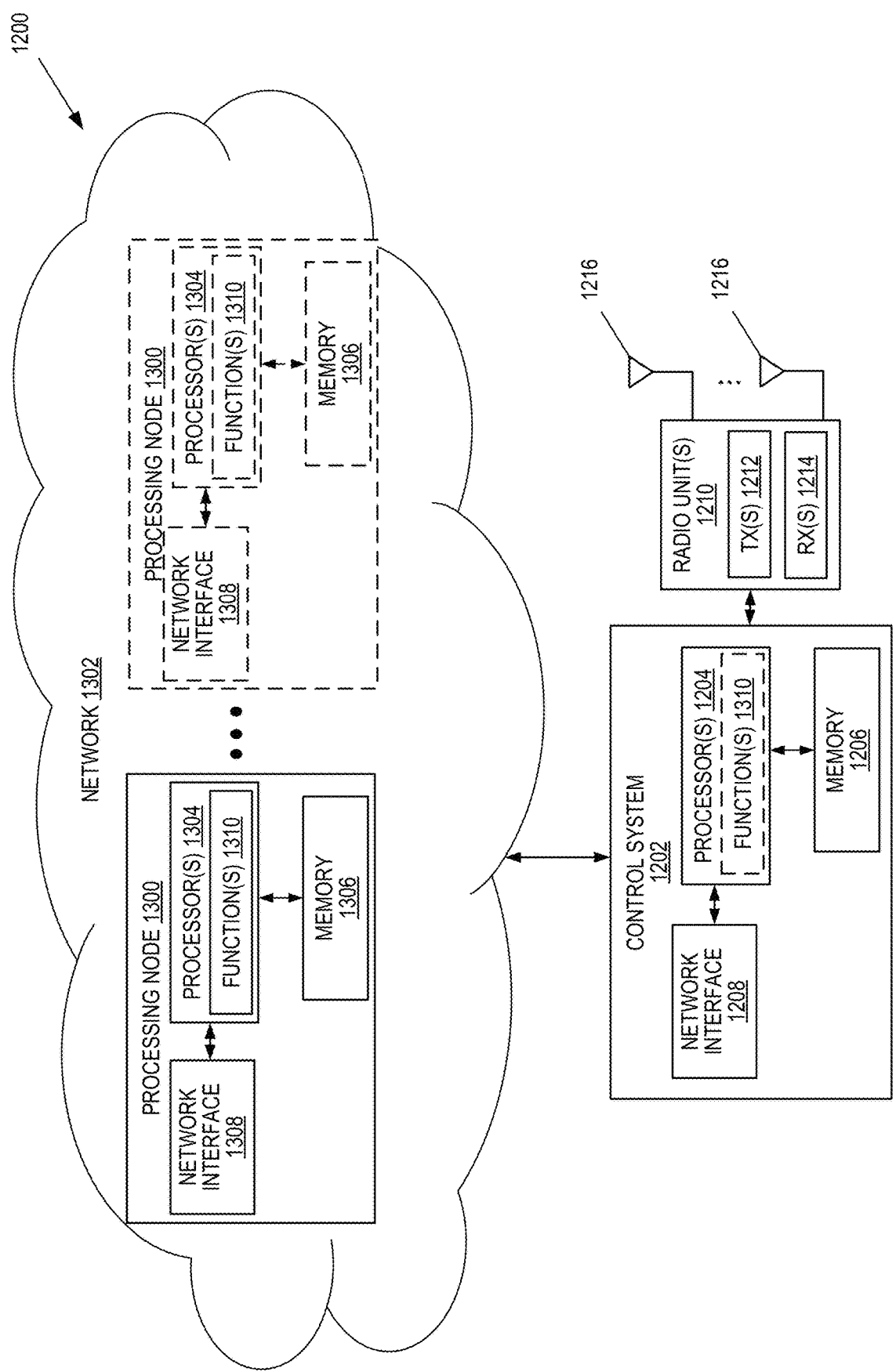
FIG. 13 is a schematic block diagram that illustrates a virtualized embodiment of the network function node 1200 according to some embodiments of the present disclosure.

FIG. 13 is a schematic block diagram that illustrates a virtualized embodiment of the network function node 1200 according to some embodiments of the present disclosure. This discussion is equally applicable to other types of network nodes. Further, other types of network nodes may have similar virtualized architectures.

As used herein, a "virtualized" radio access node is an implementation of the network function node 1200 in which at least a portion of the functionality of the network function node 1200 is implemented as a virtual component(s) (e.g., via a virtual machine(s) executing on a physical processing node(s) in a network(s)). As illustrated, in this example, the network function node 1200 includes the control system 1202 that includes the one or more processors 1204 (e.g., CPUs, ASICs, FPGAs, and/or the like), the memory 1206, the network interface 1208, the one or more radio units 1210 that each include the one or more transmitters 1212, and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the network function node 1200 described herein are implemented at the one or more processing nodes 1300 or distributed across the control system 1202 and the one or more processing nodes 1300 in any desired manner. In some particular embodiments, some or all of the functions 1310 of the network function node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicates directly with the processing node(s) 1300 via an appropriate network interface(s).

In some embodiments, a computer program including instructions which, when executed by at least one processor, causes the at least one processor to carry out the functionality of the network function node 1200 or a node (e.g., a processing node 1300) implementing one or more of the functions 1310 of the network function node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
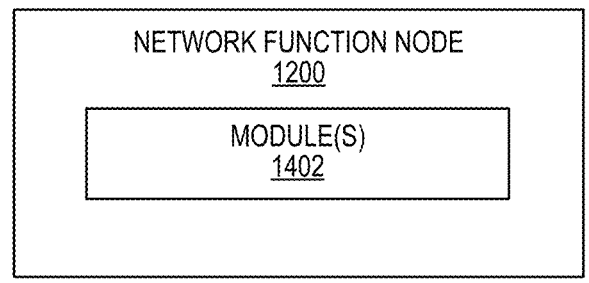
FIG. 14 is a schematic block diagram of the network function node 1200 according to some other embodiments of the present disclosure.

FIG. 14 is a schematic block diagram of the network function node 1200 according to some other embodiments of the present disclosure. The network function node 1200 includes one or more modules 1402, each of which is implemented in software. The module(s) 1402 provide the functionality of the network function node 1200 described herein, such as that attributed to a target AMF or a source AMF.

Figure 15:
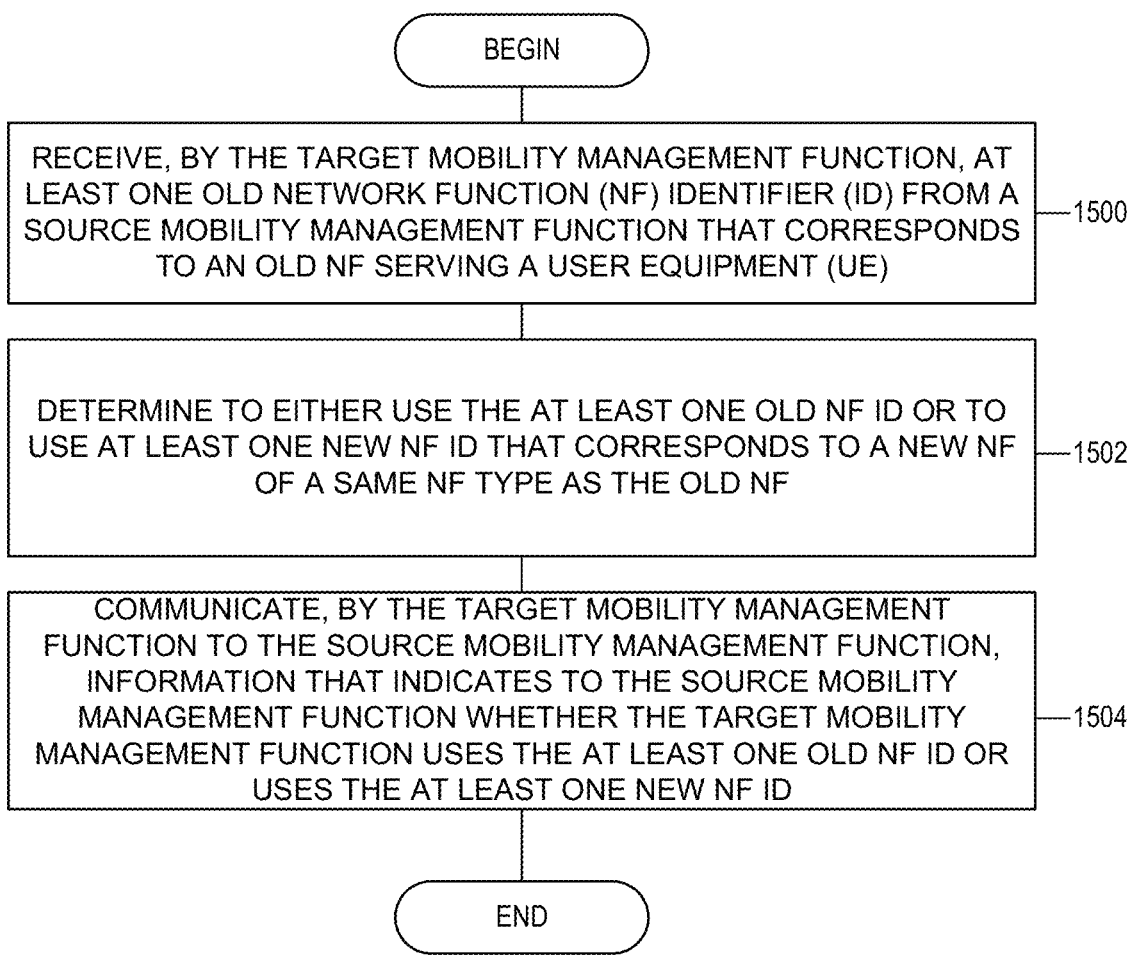
FIG. 15 is a flowchart illustrating a method for a target mobility management function in a core network to communicate NF utilization information with a source mobility management function during a change of mobility management function according to one embodiment.

FIG. 15 is a flowchart illustrating a method for a target mobility management function, such as a target AMF, in a core network to communicate NF utilization information with a source mobility management function, such as a source AMF, during a change of mobility management function according to one embodiment. The target mobility management function receives at least one old NF identifier (ID) from the source mobility management function that corresponds to an old network function (NF) serving a user equipment (UE) (block 1500). The old NF may comprise, for example, an old SMF, an old SMSF, an old PCF, or any other NF. The target mobility management function determines to either use the at least one old NF ID or to use at least one new NF ID that corresponds to a new NF of a same NF type as the old NF (block 1502). The new NF may comprise, for example, a new SMF, a new SMSF, a new PCF, or any other NF. The target mobility management function communicates, to the source mobility management function, information that indicates to the source mobility management function whether the target mobility management function uses the at least one old NF ID or uses the at least one new NF ID (block 1504).

Figure 16:
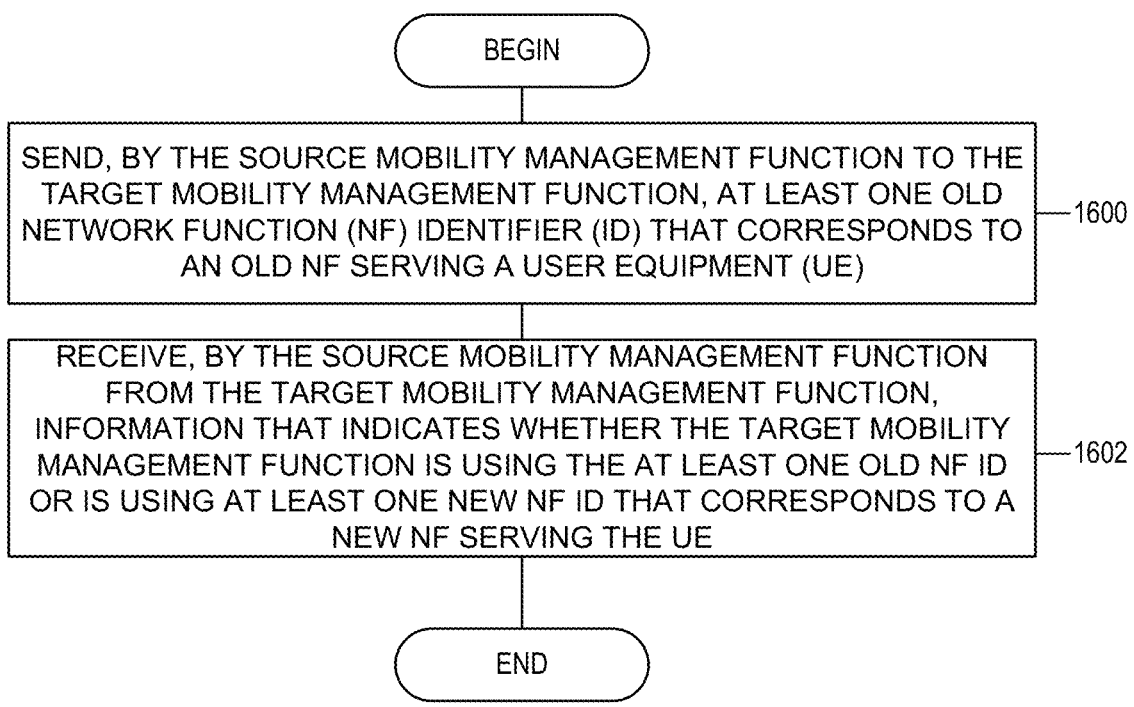
FIG. 16 is a flowchart illustrating a method implemented in a source mobility management function in accordance with one embodiment.

FIG. 16 is a flowchart illustrating a method implemented in a source mobility management function, such as a source AMF, in accordance with one embodiment. The source mobility management function sends, to the target mobility management function, such as a target AMF, at least one old NF identifier (ID) that corresponds to an old network function (NF) serving a user equipment (UE) (block 1600).

The old NF may comprise, for example, an old SMF, an old SMSF, an old PCF, or any other NF. The source mobility management function receives, from the target mobility management function, information that indicates whether the target mobility management function uses the at least one old NF ID or uses at least one new NF ID that corresponds to a new NF serving the UE (block 1602). The new NF may comprise, for example, a new SMF, a new SMSF, a new PCF, or any other NF.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some Embodiments

Some of the embodiments described above may be summarized in the following itemized manner:

Item 1. A method for a target mobility management function entity in a core network to communicate network function (NF) utilization information with a source mobility management function entity during a change of mobility management function entity, comprising:

receiving, by the target mobility management function entity, at least one old NF identifier (ID) from the source mobility management function entity that corresponds to an old NF entity serving a user equipment (UE);

determining to either use the at least one old NF ID or to use at least one new NF ID that corresponds to a new NF entity of a same NF type as the old NF entity; and communicating, by the target mobility management function entity to the source mobility management function entity, information that indicates to the source mobility management function entity whether the target mobility management function entity uses the at least one old NF ID or uses the at least one new NF ID.

Item 2. The method of item 1 wherein the NF entities comprise one or more of a short message service function (SMSF) entity, a policy control function (PCF) entity, and a session management function (SMF) entity.

Item 3. The method of item 1 wherein the target mobility management function entity comprises a target access and mobility management function (AMF) entity, and wherein the source mobility management function entity comprises a source AMF entity.

Item 4. The method of item 3 wherein communicating the information that indicates to the source mobility management function entity whether the target mobility management function entity uses the at least one old NF ID or uses the at least one new NF ID comprises:

sending, by the target AMF entity to the source AMF entity, a Namf_Communication_CreateUEContext response that indicates to the source AMF entity whether the target AMF entity uses the at least one old NF ID or uses the at least one new NF ID.

Item 5. The method of item 4 further comprising generating the Namf_Communication_CreateUEContext response while invoking a Namf_Communication_CreateUEContext service operation.

Item 6. The method of item 3 wherein communicating the information that indicates to the source AMF entity whether the target AMF entity uses the at least one old NF ID or uses the at least one new NF ID comprises:

receiving, by the target AMF entity, a handover notify from a radio access node (RAN); and invoking, by the target AMF entity in response to the handover notify, a Namf_Communication_N2InfoNotify service operation that indicates to the source AMF entity whether the target AMF entity uses the at least one old NF ID or uses the at least one new NF ID.

Item 7. The method of item 3 wherein communicating the information that indicates to the source AMF entity whether the target AMF entity uses the at least one old NF ID or uses the at least one new NF ID comprises:

invoking, by the target AMF entity, a Namf_Communication_RegistrationCompleteNotify service operation that indicates to the source AMF entity whether the target AMF entity uses the at least one old NF ID or uses the at least one new NF ID.

Item 8. The method of item 1 wherein determining to either use the at least one old NF ID or to use the at least one new NF ID that corresponds the new NF entity of the same NF type as the old NF entity comprises performing a NF service discover function to determine to either use the at least one old NF ID or to use the at least one new NF ID that corresponds to the new NF entity of the same NF type as the old NF entity.

Item 9. A method for a source mobility management function entity in a core network to receive network function (NF) utilization information from a target mobility management function entity during a change of mobility management function entity, comprising:

sending, by the source mobility management function entity to the target mobility management function entity, at least one old NF identifier (ID) that corresponds to an old NF entity serving a user equipment (UE); and receiving, by the source mobility management function entity from the target mobility management function entity, information that indicates whether the target mobility management function entity uses the at least one old NF ID or uses at least one new NF ID that corresponds to a new NF entity serving the UE.

Item 10. The method of item 9 wherein the NF entities comprise one or more of a short message service function (SMSF) entity, a policy control function (PCF) entity, and a session management function (SMF) entity.

Item 11. The method of item 9 wherein the target mobility management function entity comprises a target access and mobility management function (AMF) entity, and wherein the source mobility management function entity comprises a source AMF entity.

Item 12. The method of item 11 wherein the information indicates that the target AMF entity is using a new session management function (SMF) ID, and further comprising:

invoking a Nsmf_PDUSession_ReleaseSMContext service operation, by the source AMF entity toward an old SMF entity, to release an existing session management (SM) context in the old SMF entity.

Item 13. The method of item 11 wherein the information indicates that the target AMF entity is using an old SMF ID, and further comprising:

deleting, by the source AMF entity locally, to release an existing session management (SM) context in the source AMF entity.

Item 14. The method of item 11 wherein the information indicates that the target AMF entity is using an old policy control function (PCF) ID, and further comprising:

performing, by the source AMF entity, a local release of an old PCF that corresponds to the old PCF ID.

Item 15. The method of item 14 wherein the information indicates that the target AMF entity is utilizing a new PCF ID, and further comprising:

sending, by the source AMF entity to a PCF entity, a Npcf_AMPolicyControl_Delete service operation.

Item 16. The method of item 11 wherein the information indicates that the target AMF entity is using an old SMSF ID and further comprising:

performing, by the source AMF entity, a local release of an association context of an old SMSF entity that corresponds to the old SMSF ID.

Item 17. The method of item 11 wherein the information indicates that the target AMF entity is utilizing a new SMSF ID and further comprising:

sending, by the source AMF entity to an old SMSF entity, a Nsmsf_SMService_Deactivate service operation to trigger a release of UE Context for SMS on the old SMSF entity.

Item 18. A target mobility management function entity for communicating network function (NF) utilization information with a source mobility management function entity during a change of mobility management function entity, the target mobility management function entity comprising:

one or more processors; and memory storing instructions executable by the one or more processors, whereby the target mobility management function entity is operable to perform the method of:

receiving, by the target mobility management function entity, at least one old NF identifier (ID) from the source mobility management function entity that corresponds to an old NF entity serving a user equipment (UE);

determining to either use the at least one old NF ID or to use at least one new NF ID that corresponds to a new NF entity of a same NF type as the old NF entity; and communicating, by the target mobility management function entity to the source mobility management function entity, information that indicates to the source mobility management function entity whether the target mobility management function entity uses the at least one old NF ID or uses the at least one new NF ID.

Item 19. A source mobility management function entity for receiving network function (NF) utilization information from a target mobility management function entity during a change of mobility management function entity, the source mobility management function entity comprising:

one or more processors; and memory storing instructions executable by the one or more processors, whereby the source mobility management function entity is operable to perform the method of:

sending, by the source mobility management function entity to the target mobility management function entity, at least one old NF identifier (ID) that corresponds to an old NF entity serving a user equipment (UE); and receiving, by the source mobility management function entity from the target mobility management function entity, information that indicates whether the target mobility management function entity uses the at least one old NF ID or uses at least one new NF ID that corresponds to a new NF entity serving the UE.

Item 20. A non-transitory computer readable medium storing software instructions that, when executed by one or more processors of a network entity for performing a method for a source mobility management function entity for receiving network function (NF) utilization information from a target mobility management function entity during a change of mobility management function entity, cause the network entity to perform the method of:

sending, by the source mobility management function entity to the target mobility management function entity, at least one old NF identifier (ID) that corresponds to an old NF entity serving a user equipment (UE); and receiving, by the source mobility management function entity from the target mobility management function entity, information that indicates whether the target mobility management function entity uses the at least one old NF ID or uses at least one new NF ID that corresponds to a new NF entity serving the UE.

Item 21. A computer program comprising instructions which, when executed by at least one processor of a network entity, cause the at least one processor to perform the method of:

sending, by a source mobility management function entity to a target mobility management function entity, at least one old network function (NF) identifier (ID) that corresponds to an old NF entity serving a user equipment (UE); and receiving, by the source mobility management function entity from the target mobility management function entity, information that indicates whether the target mobility management function entity uses the at least one old NF ID or uses at least one new NF ID that corresponds to a new NF entity serving the UE.

Item 22. A carrier comprising the computer program of item 21, wherein the carrier is one of an electronic signal, an optical signal, a radio signal, or a computer readable storage medium.

Item 23. A non-transitory computer readable medium storing software instructions that, when executed by one or more processors of a network entity for performing a method for communicating network function (NF) utilization information with a source mobility management function entity during a change of mobility management function entity, cause the network entity to perform the method of:

receiving at least one old NF identifier (ID) from the source mobility management function entity that corresponds to an old NF serving a user equipment (UE);

determining to either use the at least one old NF ID or to use at least one new NF ID that corresponds to a new NF entity of a same NF entity type as the old NF entity; and communicating, to the source mobility management function entity, information that indicates to the source mobility management function entity whether the target mobility management function entity uses the at least one old NF ID or uses the at least one new NF ID.

Item 24. A computer program comprising instructions which, when executed by at least one processor of a network entity, cause the at least one processor to perform the method of:

receiving, by a target mobility management function entity, at least one old network function (NF) identifier (ID) from a source mobility management function entity that corresponds to an old NF entity serving a user equipment (UE);

determining to either use the at least one old NF ID or to use at least one new NF ID that corresponds to a new NF entity of a same NF entity type as the old NF entity; and communicating, by the target mobility management function entity to the source mobility management function entity, information that indicates to the source mobility management function entity whether the target mobility management function entity uses the at least one old NF ID or uses the at least one new NF ID.

Item 25. A carrier comprising the computer program of item 24, wherein the carrier is one of an electronic signal, an optical signal, a radio signal, or a computer readable storage medium.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
2G Second Generation
3G Third Generation
3GPP Third Generation Partnership Project
4G Fourth Generation
5G Fifth Generation
ABS Almost Blank Subframe
AC Alternating Current
AF Application Function
AMF Access and Mobility Management Function
AN Access Network
AP Access Point
ARQ Automatic Repeat Request
ASIC Application Specific Integrated Circuit
ATM Asynchronous Transfer Mode
AUSF Authentication Server Function
AWGN Additive White Gaussian Noise
BCCH Broadcast Control Channel
BCH Broadcast Channel
BS Base Station
BSC Base Station Controller
BTS Base Transceiver Station
BW Bandwidth
BWP Bandwidth Part
CA Carrier Aggregation
CC Component Carrier
CCCH Common Control Channel
CD Compact Disk
CDMA Code Division Multiple Access
CGI Cell Global Identity
CIR Channel Impulse Response
COTS Commercial Off-the-Shelf
CP Cyclic Prefix
CPE Customer Premise Equipment
CPICH Common Pilot Channel
CPICH Ec/No Common Pilot Channel received energy per chip divided by the power density in the band
CPU Central Processing Unit
CQI Channel Quality Information
C-RNTI Cell Radio Network Temporary Identifier
CSI Channel State Information
CSI-RS Channel State Information Reference Signal
D2D Device-to-Device
DAS Distributed Antenna System
DC Direct Current
DCCH Dedicated Control Channel
DIMM Dual In-Line Memory Module
DL Downlink
DM Demodulation
DMRS Demodulation Reference Signal
DN Data Network
DRX Discontinuous Reception
DSP Digital Signal Processor
DTX Discontinuous Transmission
DTCH Dedicated Traffic Channel
DUT Device Under Test
DVD Digital Video Disk
E-CID Enhanced Cell Identifier (positioning method)
EEPROM Electrically Erasable Programmable Read Only Memory
ECGI Evolved Cell Global Identifier
eMTC Enhanced Machine-Type Communication
eNB Enhanced or Evolved Node B
ePDCCH Enhanced Physical Downlink Control Channel
EPROM Erasable Programmable Read Only Memory
E-SMLC Enhanced Serving Mobile Location Center
E-UTRA Evolved Universal Terrestrial Radio Access
E-UTRAN Evolved Universal Terrestrial Radio Access Network
FDD Frequency Division Duplexing
FFS For Further Study
FPGA Field Programmable Gate Array
GERAN Global System for Mobile (GSM) Communications Enhanced Data Rates for GSM Evolution Radio Access Network
GHz Gigahertz
gNB New Radio Base Station
GNSS Global Navigation Satellite System
GPS Global Positioning System
GSM Global System for Mobile Communications
HARQ Hybrid Automatic Repeat Request
HDDS Holographic Digital Data Storage
HD-DVD High-Definition Digital Versatile Disc
HO Handover
HRPD High Rate Packet Data
HSPA High Speed Packet Access
I/O Input and Output
IoT Internet of Things
IP Internet Protocol
LAN Local Area Network
LEE Laptop Embedded Equipment
LME Laptop Mounted Equipment
LOS Line of Sight
LPP Long Term Evolution Positioning Protocol
LTE Long Term Evolution
M2M Machine-to-Machine
MAC Medium Access Control
MANO Management and Orchestration
MBMS Multimedia Broadcast Multicast Services
MBSFN Multimedia Broadcast Multicast Service Single Frequency Network
MCE Multi-Cell/Multicast Coordination Entity
MDT Minimization of Drive Tests
MIB Master Information Block MIMO Multiple Input Multiple Output
MME Mobility Management Entity
MSC Mobile Switching Center
MSR Multi-Standard Radio
MTC Machine Type Communication
NB-IoT Narrowband Internet of Things
NEF Network Exposure Function
NF Network Function
NFV Network Function Virtualization
NIC Network Interface Controller
NPDCCH Narrowband Physical Downlink Control Channel
NR New Radio
NRF Network Repository Function
NSSF Network Slice Selection Function
O&M Operation and Maintenance
OCNG Orthogonal Frequency Division Multiple Access Channel Noise Generator
OFDM Orthogonal Frequency Division Multiplexing
OFDMA Orthogonal Frequency Division Multiple Access
OSS Operations Support System
OTDOA Observed Time Difference of Arrival
OTT Over-the-Top
PBCH Physical Broadcast Channel
P-CCPCH Primary Common Control Physical Channel
PCell Primary Cell
PCF Policy Control Function
PCFICH Physical Control Format Indicator Channel
PDA Personal Digital Assistant
PDCCH Physical Downlink Control Channel
PDP Power Delay Profile
PDSCH Physical Downlink Shared Channel
P-GW Packet Data Network Gateway
PHICH Physical Hybrid Automatic Repeat Request Indicator Channel
PLMN Public Land Mobile Network
PMI Precoder Matrix Indicator
PRACH Physical Random Access Channel
PRB Physical Resource Block
PROM Programmable Read Only Memory
PRS Positioning Reference Signal
PSS Primary Synchronization Signal
PSTN Public Switched Telephone Networks
PUCCH Physical Uplink Control Channel
PUSCH Physical Uplink Shared Channel
QoS Quality of Service
RACH Random Access Channel
RAID Redundant Array of Independent Disks
RAM Random Access Memory
RAN Radio Access Network
RAT Radio Access Technology
RE Resource Element
RF Radio Frequency
RLM Radio Link Monitoring
RNC Radio Network Controller
RNTI Radio Network Temporary Identifier
ROM Read Only Memory
RRC Radio Resource Control
RRH Remote Radio Head
RRM Radio Resource Management
RRU Remote Radio Unit
RS Reference Signal
RSCP Received Signal Code Power
RSRP Reference Symbol Received Power/Reference Signal Received Power
RSRQ Reference Symbol Received Quality/Reference Signal Received Quality
RSSI Received Signal Strength Indicator
RSTD Reference Signal Time Difference
RTT Round Trip Time
RUIM Removable User Identity
SCEF Service Capability Exposure Function
SCell Secondary Cell
SCH Synchronization Channel
SDRAM Synchronous Dynamic Random Access Memory
SDU Service Data Unit
SFN System Frame Number
S-GW Serving Gateway
SI System Information
SIB System Information Block
SIM Subscriber Identity Module
SMF Session Management Function
SMSF Short Message Service Function
SNR Signal to Noise Ratio
SOC System on a Chip
SON Self-Organizing Network
SONET Synchronous Optical Networking
SRS Sounding Reference Signal
SS Synchronization Signal
SSS Secondary Synchronization Signal
TCP Transmission Control Protocol
TDD Time Division Duplexing
TDOA Time Difference of Arrival
TOA Time of Arrival
TPMI Transmit Precoding Matrix Indicator
TRP Transmission/Reception Point
TSS Tertiary Synchronization Signal
TTI Transmission Time Interval
UDM Unified Data Management
UE User Equipment
UL Uplink
UMTS Universal Mobile Telecommunications System
USB Universal Serial Bus
USIM Universal Subscriber Identity Module
UTDOA Uplink Time Difference of Arrival
UTRA Universal Terrestrial Radio Access
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network

The invention claimed is:

1. A non-transitory computer readable medium comprising instructions executable by processing circuitry of a network node that implements a target Access and mobility Management Function, AMF, entity in a core network for communicating network function, NF, utilization information with a source AMF entity during a change of AMF entity from the source AMF entity to the target AMF entity, whereby the network node is operable to:

receive, by the target AMF entity, at least one old NF identifier, ID, from the source AMF entity that corresponds to an old NF entity serving a user equipment, UE;

determine to either use the at least one old NF ID or to use at least one new NF ID that corresponds to a new NF entity of a same NF type as the old NF entity; and communicate, by the target AMF entity to the source AMF entity, information that indicates to the source AMF entity whether the target AMF entity uses the at least one old NF ID or uses the at least one new NF ID.

2. The non-transitory computer readable medium of claim 1 wherein the new and old NF entities comprise one or more of a short message service function, SMSF, entity, a policy control function, PCF, entity, and a session management function, SMF, entity.

3. The non-transitory computer readable medium of claim 1 wherein, in order to communicate the information that indicates to the source AMF entity whether the target AMF entity uses the at least one old NF ID or uses the at least one new NF ID, the network node via execution of the instructions by the processing circuitry is operable to:

send, by the target AMF entity to the source AMF entity, a Namf_Communication_CreateUEContext response that indicates to the source AMF entity whether the target AMF entity uses the at least one old NF ID or uses the at least one new NF ID.

4. The non-transitory computer readable medium of claim 3 wherein, via execution of the instructions by the processing circuitry, the network node is further operable to generate the Namf_Communication_CreateUEContext response while invoking a Namf_Communication_CreateUEContext service operation.

5. The non-transitory computer readable medium of claim 1 wherein, in order to communicate the information that indicates to the source AMF entity whether the target AMF entity uses the at least one old NF ID or uses the at least one new NF ID, the network node via execution of the instructions by the processing circuitry is operable to:

receive, by the target AMF entity, a handover notify from a radio access node, RAN; and invoke, by the target AMF entity in response to the handover notify, a Namf_Communication_N2InfoNotify service operation that indicates to the source AMF entity whether the target AMF entity uses the at least one old NF ID or uses the at least one new NF ID.

6. The non-transitory computer readable medium of claim 1 wherein, in order to communicate the information that indicates to the source AMF entity whether the target AMF entity uses the at least one old NF ID or uses the at least one new NF ID, the network node via execution of the instructions by the processing circuitry is operable to:

invoke, by the target AMF entity, a Namf_Communication_RegistrationCompleteNotify service operation that indicates to the source AMF entity whether the target AMF entity uses the at least one old NF ID or uses the at least one new NF ID.

7. The non-transitory computer readable medium of claim 1 wherein, in order to determine to either use the at least one old NF ID or to use the at least one new NF ID that corresponds the new NF entity of the same NF type as the old NF entity, the network node via execution of the instructions by the processing circuitry is operable to perform a NF service discover function to determine to either use the at least one old NF ID or to use the at least one new NF ID that corresponds to the new NF entity of the same NF type as the old NF entity.

8. A non-transitory computer readable medium comprising instructions executable by processing circuitry of a network node that implements a source Access and Mobility Management Function, AMF, entity (old AMF) in a core network for receiving network function, NF, utilization information from a target AMF entity (new AMF) during a change of AMF entity from the source AMF entity to the target AMF entity, whereby the network node is operable to:

send, by the source AMF entity to the target AMF entity, at least one old NF identifier, ID, that corresponds to an old NF entity serving a user equipment, UE; and receive, by the source AMF entity from the target AMF entity, information that indicates whether the target AMF entity uses the at least one old NF ID or uses at least one new NF ID that corresponds to a new NF entity serving the UE.

9. The non-transitory computer readable medium of claim 8 wherein the new and old NF entities comprise one or more of a short message service function, SMSF, entity, a policy control function, PCF, entity, and a session management function, SMF, entity.

10. The non-transitory computer readable medium of claim 8 wherein the information indicates that the target AMF entity is using a new session management function, SMF, ID, and via execution of the instructions via the processing circuitry, the network node is further operable to:

invoke a Nsmf_PDUSession_ReleaseSMContext service operation, by the source AMF entity toward an old SMF entity, to release an existing session management, SM, context in the old SMF entity.

11. The non-transitory computer readable medium of claim 8 wherein the information indicates that the target AMF entity is using an old session management function, SMF, ID, and via execution of the instructions by the processing circuitry, the network node is further operable to:

delete, by the source AMF entity locally, to release an existing session management, SM, context in the source AMF entity.

12. The non-transitory computer readable medium of claim 8 wherein the information indicates that the target AMF entity is using an old policy control function, PCF, ID, and via execution of the instructions by the processing circuitry, the network node is further operable to:

perform, by the source AMF entity, a local release of an old PCF entity that corresponds to the old PCF ID.

13. The non-transitory computer readable medium of claim 12 wherein the information indicates that the target AMF entity is utilizing a new PCF ID, and via execution of the instructions by the processing circuitry, the network node is further operable to:

send, by the source AMF entity to a PCF entity, a Npcf_AMPolicyControl_Delete service operation.

14. The non-transitory computer readable medium of claim 8 wherein the information indicates that the target AMF entity is using an old short message service function, SMSF, ID and, via execution of the instructions by the processing circuitry, the network node is further operable to:

perform, by the source AMF entity, a local release of an association context of an old SMSF entity that corresponds to the old SMSF ID.

15. The non-transitory computer readable medium of claim 8 wherein the information indicates that the target AMF entity is utilizing a new short message service function, SMSF, ID and, via execution of the instructions by the processing circuitry, the network node is further operable to:

send, by the source AMF entity to an old SMSF entity, a Nsmsf_SMService_Deactivate service operation to trigger a release of UE Context for session management function, SMS, on the old SMSF entity.

* * * * *

UNITED STATES PATENT AND TRADEMARK OFFICE
CERTIFICATE OF CORRECTION

PATENT NO. : 11,792,697 B2
APPLICATION NO. : 17/747370
DATED : October 17, 2023
INVENTOR(S) : Chen et al.

Page 1 of 1

It is certified that error appears in the above-identified patent and that said Letters Patent is hereby corrected as shown below:

In the Specification

In Column 1, Line 6, delete "2020," and insert -- 2020, now U.S. Pat. No. 11,382,006, --, therefor.

In Column 11, Line 22, delete "( )" and insert -- ( ). --, therefor.

In Column 11, Line 32, delete "Q." and insert -- ( ). --, therefor.

In Column 11, Line 35, delete "0" and insert -- ( ) --, therefor.

In Column 22, Line 4, delete "Removable User Identity" and insert -- Removable User Identity Module --, therefor.

Signed and Sealed this
Twenty-seventh Day of February, 2024

Katherine Kelly Vidal
*Director of the United States Patent and Trademark Office*